United States Patent
Brdiczka et al.

(10) Patent No.: US 11,615,239 B2
(45) Date of Patent: Mar. 28, 2023

(54) ACCURACY OF NATURAL LANGUAGE INPUT CLASSIFICATION UTILIZING RESPONSE DELAY

(71) Applicant: Adobe Inc., San Jose, CA (US)

(72) Inventors: Oliver Brdiczka, San Jose, CA (US);
Ajinkya Kale, San Jose, CA (US);
Piyush Chandra, Belmont, CA (US);
Tracy King, Mountain View, CA (US);
Abhishek Gupta, Uttar Pradesh (IN);
Sourabh Goel, Uttar Pradesh (IN);
Nitin Garg, Faridabad (IN); Deepika Naryani, Delhi (IN); Feroz Ahmad, New Delhi (IN); Vikas Sagar, San Jose, CA (US)

(73) Assignee: Adobe Inc., San Jose, CA (US)

( * ) Notice: Subject to any disclaimer, the term of this patent is extended or adjusted under 35 U.S.C. 154(b) by 391 days.

(21) Appl. No.: 16/836,462

(22) Filed: Mar. 31, 2020

(65) Prior Publication Data
US 2021/0303784 A1    Sep. 30, 2021

(51) Int. Cl.
| G06F 15/16 | (2006.01) |
| G06F 9/54 | (2006.01) |
| H04L 29/06 | (2006.01) |
| G06F 40/20 | (2020.01) |
| G06F 40/40 | (2020.01) |
| G06F 40/35 | (2020.01) |
| H04L 51/00 | (2022.01) |

(52) U.S. Cl.
CPC ............. *G06F 40/20* (2020.01); *G06F 40/35* (2020.01); *G06F 40/40* (2020.01); *H04L 51/00* (2013.01); *G06F 9/546* (2013.01)

(58) Field of Classification Search
CPC .......... G06F 40/20; G06F 40/35; G06F 40/40; G06F 9/546; H04L 51/00
USPC .............................................. 704/9
See application file for complete search history.

(56) References Cited

U.S. PATENT DOCUMENTS

| 6,606,594 B1 * | 8/2003 | Sejnoha ................. G10L 15/05 704/250 |
| 9,437,186 B1 * | 9/2016 | Liu ......................... G10L 15/05 |
| 10,749,823 B1 * | 8/2020 | Popa ...................... G06F 16/29 |
| 10,789,945 B2 * | 9/2020 | Acero .................... G10L 25/78 |
| 11,217,230 B2 * | 1/2022 | Iwase .................... G06N 7/005 |
| 2002/0184017 A1 * | 12/2002 | Lee ......................... G10L 25/87 704/E11.005 |
| 2005/0256711 A1 * | 11/2005 | Lahti ...................... G10L 25/87 704/E11.005 |

(Continued)

*Primary Examiner* — Hamza N Algibhah
(74) *Attorney, Agent, or Firm* — Keller Preece PLLC

(57) ABSTRACT

The present disclosure relates to systems for identifying instances of natural language input, determining intent classifications associated with instances of natural language input, and generating responses based on the determined intent classifications. In particular, the disclosed systems intelligently identify and group instances of natural language input based on characteristics of the user input. Additionally, the disclosed systems determine intent classifications for the instances of natural language input based message queuing in order to delay responses to the user input in ways that increase accuracy of the responses, while retaining a conversational aspect of the ongoing chat. Moreover, in one or more embodiments, the disclosed systems generate responses utilizing natural language.

20 Claims, 12 Drawing Sheets

(56) References Cited

U.S. PATENT DOCUMENTS

| | | | |
|---|---|---|---|
| 2006/0074671 A1* | 4/2006 | Farmaner | G10L 15/193 |
| | | | 704/E15.022 |
| 2006/0287859 A1* | 12/2006 | Hetherington | G10L 25/87 |
| | | | 704/E11.005 |
| 2016/0358598 A1* | 12/2016 | Williams | G10L 17/02 |
| 2016/0379632 A1* | 12/2016 | Hoffmeister | G10L 15/183 |
| | | | 704/253 |
| 2019/0066672 A1* | 2/2019 | Wood | G10L 15/22 |
| 2019/0103095 A1* | 4/2019 | Singaraju | G06N 5/003 |
| 2019/0251960 A1* | 8/2019 | Maker | G10L 21/0232 |
| 2019/0354588 A1* | 11/2019 | Zhelezniak | G06F 40/30 |
| 2020/0005795 A1* | 1/2020 | Chae | G10L 17/00 |
| 2020/0273448 A1* | 8/2020 | Min | G10L 15/22 |
| 2020/0342032 A1* | 10/2020 | Subramaniam | G06F 16/90332 |
| 2021/0134278 A1* | 5/2021 | Iwase | G10L 13/00 |
| 2021/0216706 A1* | 7/2021 | Vaughn | G06K 9/6267 |

* cited by examiner

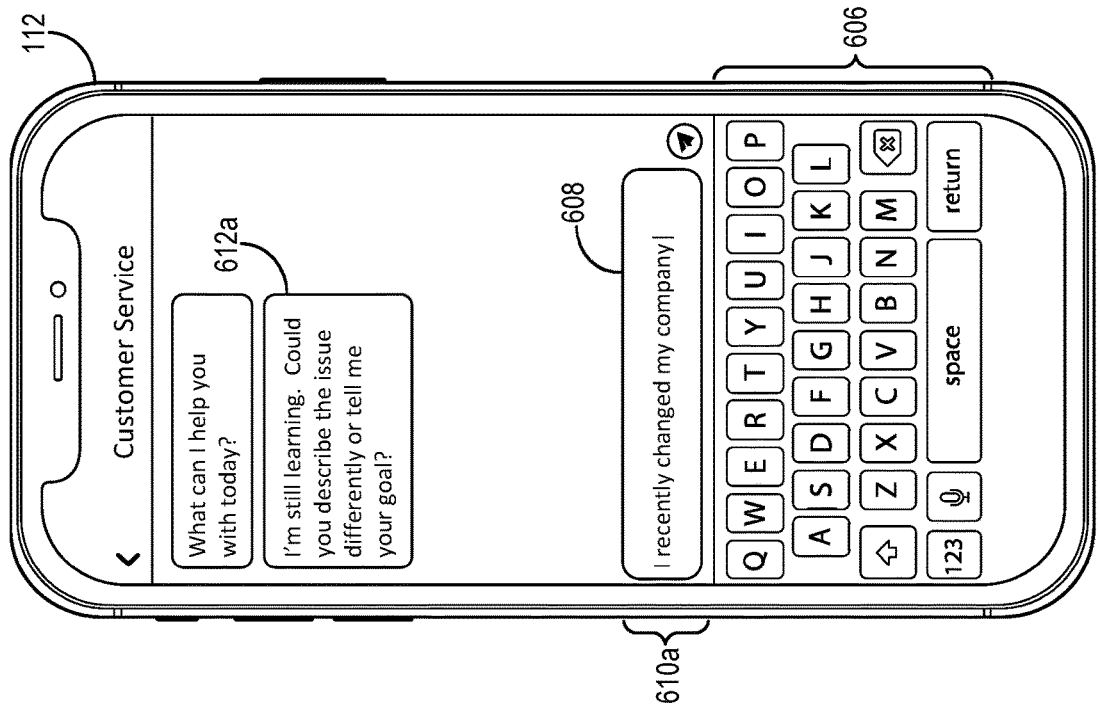
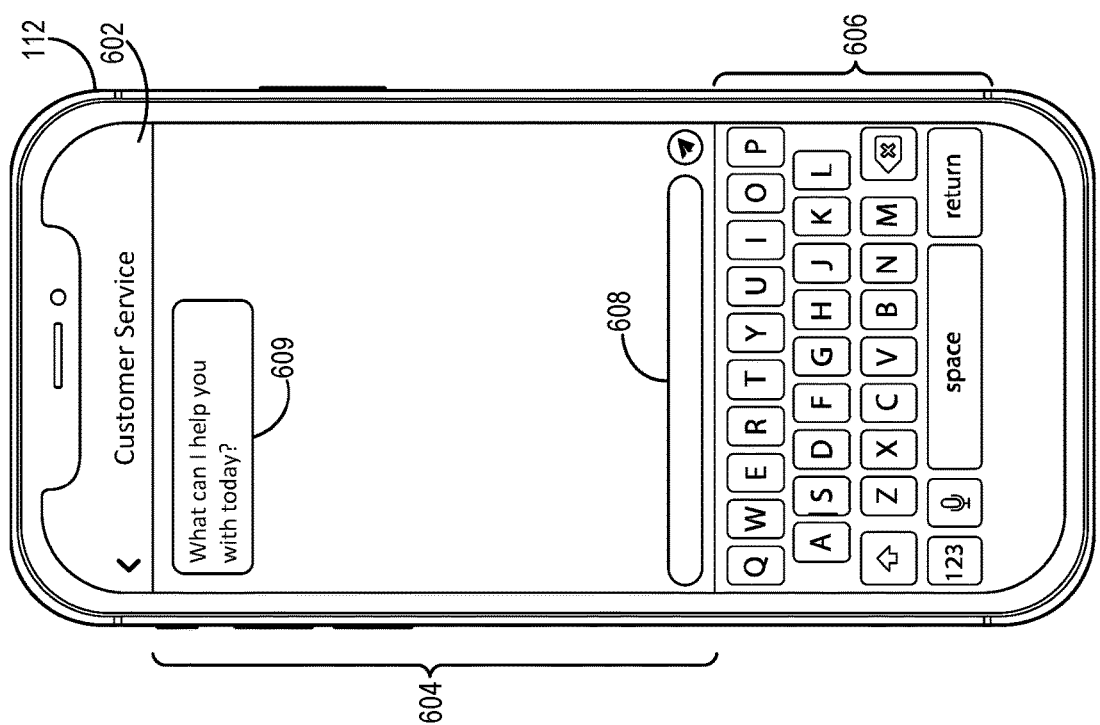

ACCURACY OF NATURAL LANGUAGE INPUT CLASSIFICATION UTILIZING RESPONSE DELAY

BACKGROUND

Recent years have seen significant improvements in natural language processing systems. For example, in response to receiving a user input (e.g., a question in the form of a textual input), a conventional system can analyze the user input to determine an intent associated with the input and formulate a response. Unfortunately, these conventional system tend to suffer from a number of drawbacks.

BRIEF SUMMARY

Embodiments of the present disclosure include systems, non-transitory computer-readable media, and methods for improving accuracy of natural language input classification by using heuristics and machine learning to determine when to process instances of natural language input. In particular, the disclosed systems can improve accuracy of natural language input classification by intelligently determining how to group, and when to process, instances of natural language input to reduce or avoid misclassifying the intent of the instances of natural language input. The disclosed systems can further utilize state tracking associated with a client device from which instances of natural language input are identified and in connection with a message queue to effectively batch the processing of instances of natural language input in order to output responses to user inputs that are relevant, timely, and conversational. Thus, the disclosed systems flexibly can provide responses to user inputs that are both computationally efficient and relevant to continuously provided user inputs on client device.

BRIEF DESCRIPTION OF THE DRAWINGS

The detailed description provides one or more embodiments with additional specificity and detail through the use of the accompanying drawings, as briefly described below.

FIGS. 6A-6C illustrate graphical user interfaces for providing user inputs and receiving automatically generated responses in accordance with one or more embodiments.

DETAILED DESCRIPTION

Figure 1:
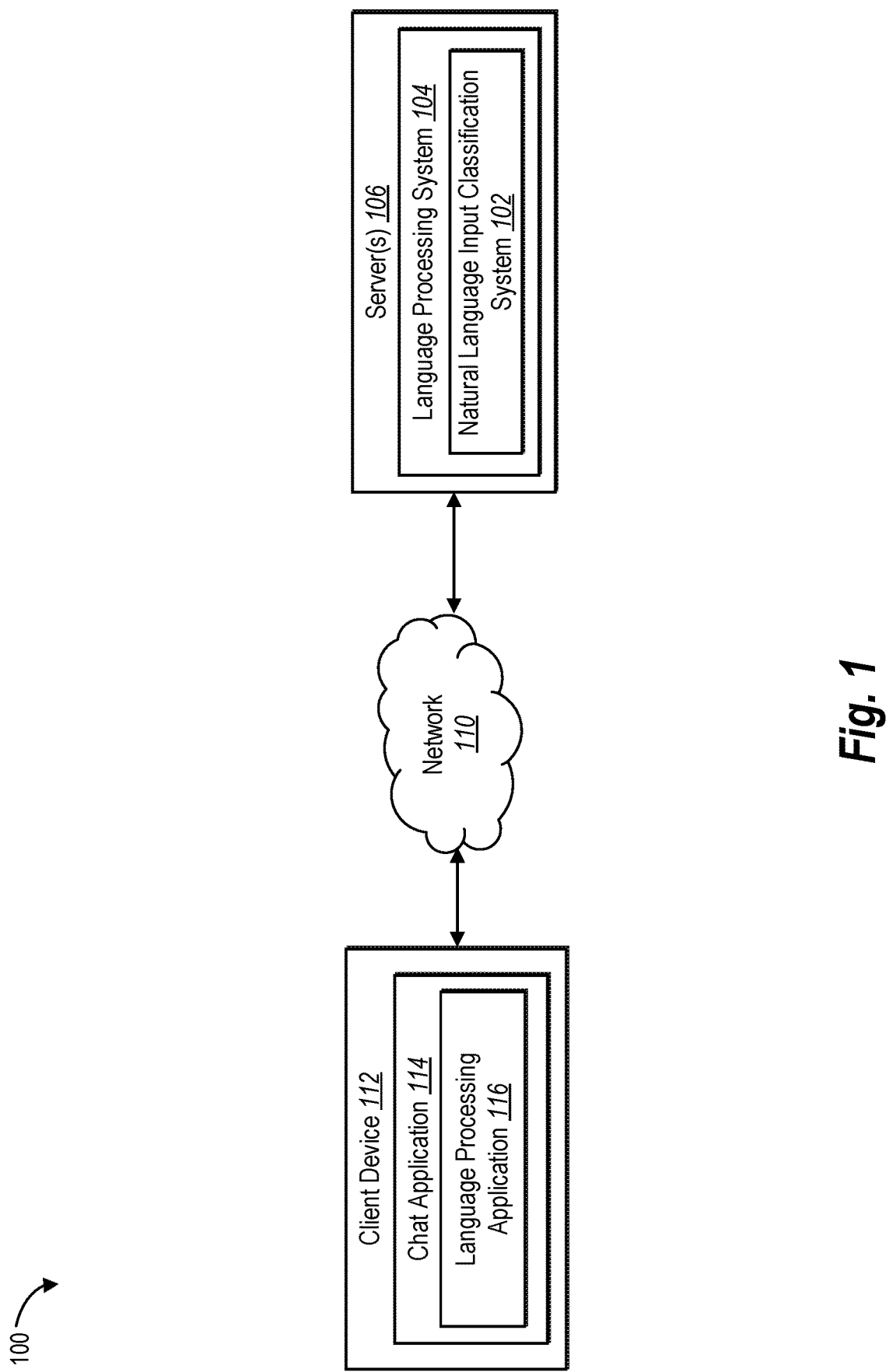
FIG. 1 illustrates an example environment in which a natural language input classification system can operate in accordance with one or more embodiments.

One or more embodiments of the present disclosure include a natural language input classification system that improves accuracy of natural language input classification by processing user input to avoid processing incomplete or overly inclusive instances of natural language input that can lead to misclassification. In particular, the natural language input classification system can intelligently group instances of natural language input for processing by an intent classification model. Furthermore, in one or more embodiments, the natural language input classification system processes identified instances of natural language input based on an ongoing chat state analysis associated with the client device where the instances of natural language input are provided. Specifically, the natural language input classification system can add received instances of natural language input to a message queue and process the contents of the message queue in response to one or more of: a chat state associated with the client device, an activated trigger associated with at least one of the instances of natural language input in the message queue, or a number of instances of natural language input already in the message queue. In this way, the natural language input classification system can accurately and efficiently determine intent classifications for instances of natural language input in order to generate meaningful responses.

To further illustrate, within the context of a user interaction forum (e.g., such as a chat application), the natural language input classification system can detect user input. In one or more embodiments, the natural language input classification system can identify instances of natural language input within the detected user input based on input triggers. For example, the natural language input classification system can identify instances of natural language input within the detected user input based on input triggers such as, but not limited to, a pause or rate decline in the ongoing user input (e.g., a pause or slow-down in typing), a specific character input (e.g., a carriage return), a specific keyword, or a particular grammatic or syntactic marker to tag. Based on a detected input trigger associated with the user input, the natural language input classification system can identify a fragment or portion of the user input as a natural language input to processing using a natural language processing ("NLP") model. In other words, the natural language input classification system can group the user input received from a time starting at the beginning of the input detection up until the detection of the input trigger to then process this group as a.

The natural language input classification system can also set and track one or more states associated with a client device in order to accurately and efficiently identify and process instances of natural language input from the client device. For example, in one or more embodiments, the natural language input classification system sets and tracks a state indicating that user input is currently being detected from the client device (e.g., a "composing" state), and a state indicating that the user input is complete (e.g., an "active" state). Based on the current state associated with the client device, the natural language input classification system can accurately identify instances of natural language input within user input that may or may not be continuously detected, add instances of natural language input to a message queue, and process instances of natural language input out of the message queue to determine intent classifications associated with the instances of natural language input.

In one or more embodiments, the natural language input classification system can receive and process instances of natural language input and chat state indicators from a client device. For example, in response to receiving an instance of natural language input and a chat state indicator from a client device (e.g., via a language processing application installed on the client device), the natural language input classification system can add the instance of natural language input to a message queue for processing. In at least one embodiment, based on the existing instances of natural language input in the message queue and the current chat state indicator, the natural language input classification system can assign a queue trigger to the newly received instance of natural language input in the message queue.

Additionally, the natural language input classification system can process instances of natural language input from the message queue in response to detecting an activated queue trigger. For example, the natural language input classification system can detect activation of a queue trigger associated with at least one of the instances of natural language input in the message queue. For example, the queue trigger can include, but not is limited to, an elapse of a threshold amount of time, or a number of characters or words in an instance of natural language input exceeding a threshold amount. In response to detecting activation of a queue trigger associated with at least one of the instances of natural language input in the message queue, the natural language input classification system can process the message queue to determine an intent classification associated with the user messaging content therein.

In one or more embodiments, the natural language input classification system processes natural language input from the message queue to determine an intent classification associated with the instance(s) of natural language input. For example, the natural language input classification system utilizes a natural language processing (NLP) model to determine an intent classification. For instance, the natural language input classification system generates an input vector based on the instance(s) of natural language input. The natural language input classification system processes the input vector using an NLP model to generate an intent classification. In additional embodiments, the natural language input classification can determine an intent classification associated with natural language input based on keyword analysis, syntax and grammar analysis, known intent comparisons, and so forth. In one or more embodiments, the natural language input classification can utilize any of these processing techniques in series or in parallel in order to process natural language input.

Furthermore, the natural language input classification system can generate one or more responses based on the determined intent classification associated with one or more instances of natural language input. For example, the natural language input classification system generates a response including a selectable message element that is based on or directed toward the intent classification associated with the processed natural language input. After providing the generated response to the client device, the natural language input classification system can provide additional information associated with the intent in response to a detected selection of the selectable message element.

In at least one embodiment, the natural language input classification may determine more than one intent associated natural language input in a message queue. In such an embodiment, the natural language input classification system can generate a response associated with each determined intent. In response to a user selection of one of the generated responses, the natural language input classification system can utilize the user selection to further train the NLP model.

Implementations of the present disclosure provide various advantageous over conventional systems. For instance, conventional systems inflexibly rely on user submissions to begin processing user inputs. Specifically, conventional systems generally process user inputs in response to a detected user event, such as a detected selection of a "submit" button in association with a text input box. Such conventional systems then process the entirety of the user input, which may lead to confusing intent classifications (e.g., because a large user input may include multiple thoughts or complete messages).

Even when conventional systems process portions of user inputs, conventional systems can be inaccurate. For example, a conventional system may, at regular intervals (e.g., every 2 seconds), receive and process portions of user input. This approach generally leads to inaccurate results because blindly portioned user input (e.g., input that is portioned every 2 seconds) may or may not include an actionable intent. Thus, in response to receiving a portion of a larger user input, a conventional system may inaccurately output an intent result that is incorrect.

Additionally, the inflexibility and inaccuracy of conventional systems typically leads to multiple system inefficiencies. For example, when a conventional system only begins processing a natural language input in response to a detected user event, such as a detected selection of a "submit" button, the system wastes computing resources in processing a larger input that could have been more efficiently processed in fragments or portions. Similarly, when a conventional system processes fragments or portions at a predetermined interval (e.g., every 2 seconds), the system again wastes computing resources in processing fragments that are not directed to any relevant and/or actionable intent.

The natural language input classification system can solve one or more of the foregoing or other shortcomings of conventional systems. For example, the natural language input classification system can improve flexibility by intelligently identifying groupings of instances of natural language input to process based on nuanced input. In contrast to conventional systems that either process blocks of user input in response to a detected selection of a "submit" button or fragments of user input in response to the elapse of a static amount of time (e.g., every 2 seconds), the natural language input classification system identifies instances of natural language input within user input based on input triggers associated with input characteristics directed to how the input is received (e.g., pauses, typing rate changes), and/or what the input contains (e.g., grammar, syntax, special characters such as question marks, exclamation points, commas, semicolons, hyphens, and so forth). Thus, the natural language input classification system flexibly identifies and analyzes instances of natural language input that are both concise and likely to include actionable intents.

In addition to improving flexibility, the natural language input classification system can also improve accuracy relative to conventional systems. For example, rather than identifying and processing user input fragments of uniform length (e.g., after blindly extracting user input fragments every 3 seconds), the natural language input classification system identifies instances of natural language input to process based on various input triggers. As mentioned above, the natural language input classification system can identify instances of natural language input in response to input triggers that are tied to characteristics of the user input. In this way, the natural language input classification system accurately identifies instances of natural language input for intent classification processing from a larger user input.

Moreover, by improving flexibility and accuracy, the natural language input classification system also improves efficiency. Indeed, while conventional systems waste computing resources in processing either user input fragments that may not include an actionable intent or user inputs blocks in their entirety, the natural language input classification system utilizes intelligently identified instances of natural language input and chat state tracking to efficiently process user inputs. For instance, the natural language input classification system avoids resource waste by increasing the likelihood that processed natural language input includes an actionable intent and that the user of the client device is at a conversational point where providing additional information associated with that intent is appropriate.

Additional detail regarding the natural language input classification system will now be provided with reference to the figures. For example, FIG. 1 illustrates a schematic diagram of an example system environment 100 (e.g., the "environment" 100) for implementing a natural language input classification system 102 in accordance with one or more embodiments. Thereafter, a more detailed description of the components and processes of the natural language input classification system 102 is provided in relation to the subsequent figures.

As shown in FIG. 1, the environment 100 includes server(s) 106, a client device 112, and a network 110. Each of the components of the environment 100 can communicate via the network 110, and the network 110 may be any suitable network over which computing devices can communicate. Example networks are discussed in more detail below in relation to FIG. 10.

As mentioned, the environment 100 includes the client device 112. The client device 112 can be one of a variety of computing devices, including a smartphone, tablet, smart television, desktop computer, laptop computer, virtual reality device, augmented reality device, or other computing device as described in relation to FIG. 10. Although FIG. 1 illustrates a single client device 112, in some embodiments the environment 100 can include multiple different client computing devices, each associated with a different user. The client device 112 can further communicate with the server(s) 106 via the network 110. For example, the client device 112 can receive user input. For example, the client device 112 can receive natural language input via a chat communication application (e.g., captured speech, text, or combinations thereof, automatic speech recognition output by either the client device 112, a third-party server, or the language processing system 104) and provide the information pertaining to user input to the server(s) 106.

In one or more embodiments, the client device 112 includes a chat application 114. The chat application can comprise a help application or other application that allows a user to communicate with a chat bot, an artificial intelligence system, or a hybrid consumer representative/AI system. The chat application 114 can also include a language processing application 116. In particular, the chat application 114 may be a web application, a native application installed on the client device 112 (e.g., a mobile application, a desktop application, etc.), or a cloud-based application where part of the functionality is performed by the server(s) 106. The chat application 114 can host a chat communication feature wherein a user of the client device 112 can engage in a natural language-based chat communications with the language processing system 104.

As illustrated in FIG. 1, the environment 100 includes the server(s) 106. The server(s) 106 may include one or more individual servers that may generate, store, receive, and transmit electronic data. For example, the server(s) 106 may receive data from the client device 112 in the form of a user input, such as a keystroke stream. In addition, the server(s) 106 can transmit data to the client device 112. Furthermore, the server(s) 106 can include one or more machine learning models. In some embodiments, the server(s) 106 comprises a content server. The server(s) 106 can also comprise an application server, a communication server, a web-hosting server, a social networking server, or a digital content analytics server.

As shown in FIG. 1, the server(s) 106 can also include the natural language input classification system 102 as part of a language processing system 104. The language processing system 104 can communicate with the client device 112 to receive, generate, modify, analyze, store, and transmit digital content. For example, the language processing system 104 can identify information associated with a determined intent classification associated with a natural language input analyzed by the natural language input classification system 102.

Although FIG. 1 depicts the natural language input classification system 102 located on the server(s) 106, in some embodiments, the natural language input classification system 102 may be implemented by (e.g., located entirely or in part) on one or more other components of the environment 100. For example, the natural language input classification system 102 may be implemented in whole, or in part, by the client device 112.

Figure 2:
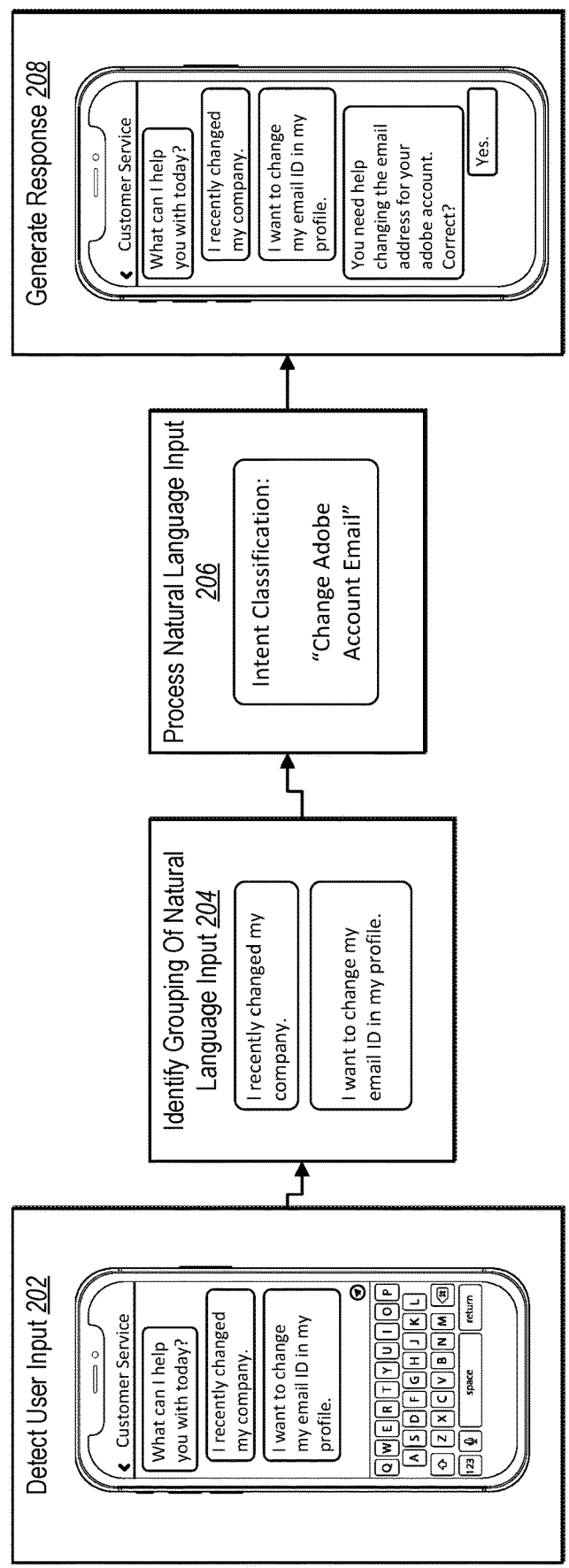
FIG. 2 illustrates an overview of a process of determining an intent classification associated with natural language input in accordance with one or more embodiments.

As discussed above, the natural language input classification system 102 can intelligently generate targeted responses to groupings of one or more instances of natural language input. User input can comprise natural language input received via a client device. FIG. 2 illustrates an overview of the process by which the natural language input classification system 102 identifies, groups, and processes instances of natural language input. An instance of natural language input can comprise a portion, segment, or fragment written or spoken input. For example, an instance of natural language input can include one or more words. In one or more embodiments, the natural language input classification system identifies instances of natural language input to process within user input based on characteristics of the user input such as pauses in the user input, user input rate changes, keywords, special characters, and grammar and/or syntax tags.

Specifically, FIG. 2 illustrates the natural language input classification system 102 detect user input 202. For example, in one or more embodiments, the natural language input classification system 102 detects user input by receiving a user input data stream from the client device 112. Additionally or alternatively, the natural language input classification system 102 can directly detect user input via the chat application 114 installed on the client device. A user input can include a text input (e.g., received via a physical or touch screen keyboard associated with the client device 112), auditory input (e.g., spoken input received via a microphone associated with the client device 112), touch gesture input (e.g., received via a touch screen associated with the client device 112), or other type of input (e.g., gyroscopic or accelerometer data generated by the client device 112). The natural language input classification system can continuously detect user input in real-time as it is being entered by the user of the client device 112.

As further shown in FIG. 2, the natural language input classification system 102 can identify a natural language input 204 to process within the detected user input. For example, the natural language input classification system 102 can identify an instance of natural language input to process within the detected user input based on characteristic-driven input triggers associated with the user input. For instance, the natural language input classification system 102 can identify one or more instance of natural language input to process based on input triggers including a pause in the continuous detection of the user input, an input rate change association user input, a specific character identified within the user input, a keyword identified within the user input, and/or grammatic or syntactic characteristics of the user input. In one or more embodiments, in response to identifying one or more characteristic-driven input triggers associated with the user input, the natural language input classification system 102 can identify an instance of natural language input to process that is a fragment or portion of the received user input.

In one or more implementations, the natural language input classification system 102 processes instances of natural language input in batches utilizing a message queue. A message queue can include a listing, table, or other storage mechanism for retaining instances of natural language input prior to processing for intent classifications. In one or more embodiments, the message queue is a first-in-first-out queue—meaning that the first instance of natural language input added to the message queue is the first instance of natural language input processed out of the message queue. Put another way, that the oldest instance of natural language input in the message queue is processed first. In at least one embodiment, the message queue includes a predetermined number of slots or spaces that each accept or a an instance of natural language input. For example, the predetermined number may be static, or may be user-alterable. Alternatively, the message queue may accept any number of instances of natural language input. Additionally, in one or more embodiments, the natural language input classification system 102 can group instances of natural language input into queues that are specific to predetermined types (e.g., a type associated with the language processing application 116—enterprise versus individual).

In one or more embodiments, the natural language input classification system 102 adds the identified instances of natural language input to a message queue and then processes the instances of natural language input in the message queue if 1) various conditions associated with a current chat state of the client device are satisfied, and 2) an activated queue trigger is detected. In at least one embodiment, the natural language input classification system 102 can add additional information to the message queue along with the instance of natural language input. For instance, the natural language input classification system 102 can add a conversation identifier to the message queue in association with an instance of natural language input.

A conversation identifier can refer to a label that indicates a user conversation from which the natural language input classification system extracted a particular instance of natural language input. For example, in at least one embodiment, the natural language input classification system processes instances of natural language input from multiple client devices. For instance, users of two client devices may initiate chat communications with a language processing system including the natural language input classification system in order to seek customer service assistance. The natural language input classification system can receive identifiers and instances of natural language input from both client devices. In that embodiment, the natural language input classification system can process the instances of natural language input and generate responses for both client devices, utilizing the conversation identifiers to correctly match the generated responses to the appropriate client device and/or conversation.

Additionally, in response to determining that certain conditions associated with the message queue and the current chat state of the client device are satisfied, the natural language input classification system 102 can add/associate a queue trigger with an instance of natural language input in the message queue. A queue trigger can refer to a predefined condition that the natural language input classification system can assign to an instance of natural language input within a message queue. In response to determining that the predefined condition assigned to the instance of natural language input is satisfied, the natural language input classification system can determine that the queue trigger is activated. In at least one embodiment, once the queue trigger is activated, the natural language input classification system can perform additional tasks, such as processing one or more instances of natural language input within the message queue where the activated queue trigger is detected. In one or more implementations, the natural language input classification system 102 can associate a time elapse queue trigger, or a max character queue trigger with an instance of the natural language input within the message queue. Depending on the queue trigger type, the natural language input classification system 102 can detect when the queue trigger is activated by determining that a predetermined amount of time has elapsed or that the instance of natural language input includes a number of characters greater than a threshold amount.

Based on the activated queue trigger, characteristics of the message queue, and the current chat state of the client device, the natural language input classification system 102 can perform an act 206 of processing the instance(s) of natural language input in the message queue. For example, the natural language input classification system 102 can utilize one or more computer models to perform a natural language analysis of the natural language input in order to extract one or more intent classifications from the natural language input. In at least one embodiment, in response to detecting an activated trigger associated with an instance of natural language input in the message queue, the natural language input classification system 102 can process the message queue in its entirety.

In any event, the natural language input classification system 102 determines the intent and/or intent classification of one or more instances of natural language input. The intent or intent class cation can refer to a purpose, theme, meaning, action, request, or instruction associated with the natural language input. In particular, intent can include a verb object pair extracted from a text input that indicates requested (or desired) action or conduct. For instance, in the text input, "How do I save my text file," an intent can include the verb object pair, "save file." In one or more embodiments, a verb object pair is not limited to a single verb and a single object. For example, a verb object pair can include one or more verbs, one or more objects, and/or one or more modifiers (e.g., adjectives or adverbs) (e.g., in photo editing, a verb object pair reflecting an intent can include "brighten blue jacket" which comprises a verb, adjective, and noun). As will be discussed further below, the natural language input classification system increases the likelihood that a group of one or more instances of natural language input will include an actionable intent by utilizing user input characteristics to more accurately group instances of natural language input. In another embodiment, the intent can include other types of syntactic constructions such as a noun-noun pair (e.g., "my file save failed"), or gerund noun pair (e.g., "saving files isn't working right").

With a determined intent classification associated with the one or more instances of natural language input, the natural language input classification system 102 can generate a response 208. For example, the natural language input classification system 102 can utilize natural language techniques to generate a response based on the determined intent classification such that the generated response applies to the detected user input (e.g., as in the act 202) in a way that is easily read by a user of the client device 112. In one or more embodiments, the natural language input classification system 102 can generate the response to include one or more selectable message elements, such as hyperlinks, associated with the determined intent classification. In response to a detected selection of a message element, the natural language input classification system 102 can generate additional electronic messages, redirect a display of the client device 112 to a web page, or transfer the communication thread with the user of the client device 112 to a dedicated customer service representative.

As mentioned above, the natural language input classification system 102 can detect user input and identify one or more instances of natural language input to process based on the detected user input. Additional detail is now provided in FIG. 3 with regard to the process by which the natural language input classification system 102 analyzes user input in order to identify instance(s) of natural language input to process. As an initial matter, the natural language input classification system 102 can perform the acts illustrated in FIG. 3 on the client device 112 (e.g., via the chat application 114 and/or language processing application 116). Alternatively, the natural language input classification system 102 can perform the acts illustrated in FIG. 3 on the server(s) 106. Alternatively, the natural language input classification system 102 can perform some of the acts on the client device 112 and some of the acts on the server(s) 106.

Figure 3:
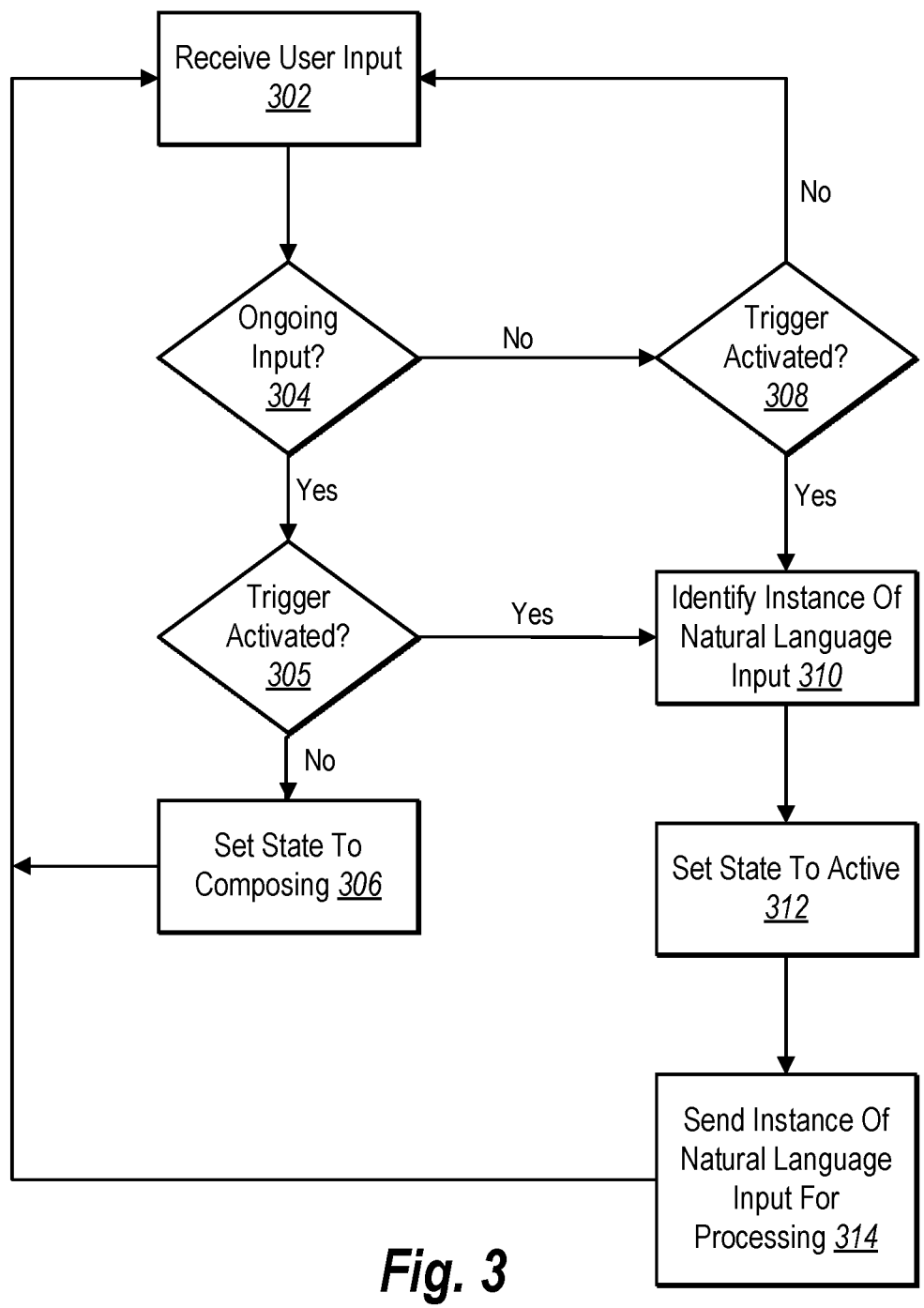
FIG. 3 illustrates a state diagram of processing instances of natural language input in accordance with one or more embodiments.

As illustrated in FIG. 3, the natural language input classification system 102 can receive user input in act 302. For example, the natural language input classification system 102 can receive textual user input as a keystroke stream from the client device 112. To illustrate, the natural language input classification system 102 can detect user interaction information associated with a physical or touch screen keyboard as a stream of keystroke character selections. In one or more embodiments, the natural language input classification system 102 detects user keystrokes via chat functionality within the chat application 114 installed on the client device 112. For example, the natural language input classification system 102 can detect the user keystrokes as the user is entering text into a text box within a chat feature as the user is composing a question or statement to direct to the language processing system 104.

Additionally or alternatively, the natural language input classification system 102 can detect user interaction information as an auditory stream from a microphone or audio application associated with the client device 112. For example, in at least one embodiment, the chat application 114 may include a talk-to-text feature wherein the language processing application 116 receives auditory input and utilizes natural language processing to convert the auditory input to text. The natural language input classification system 102 may incorporate this functionality into a chat feature of the chat application 116. To illustrate, the natural language input classification system 102 may generate a text translation of words spoken by a user in connection with the chat application 114.

As further illustrated in FIG. 3, the natural language input classification system 102 can determine whether the received user input is ongoing in act 304. In one or more embodiments, the natural language input classification system 102 can detect and receive ongoing user input. For example, the natural language input classification system 102 can receive continuous typing as a keystroke stream from the client device 112. In at least one embodiment, the natural language input classification system 102 receives a continuous stream of user input while the input is ongoing (e.g., as with continuous typing).

In response to determining that the received user input is ongoing (e.g., "Yes" in the act 304), the natural language input classification system 102 can determine if an ongoing user input trigger is activated in act 305. For example, the natural language input classification system 102 can detect that user input is ongoing but a thought has been completed. Thus, the natural language input classification system 102 can determine an ongoing user input trigger is activated if despite ongoing user input, there is an indication that there is sufficient input to classify. As an example, the natural language input classification system 102 can detect that an ongoing user input trigger is activated, despite ongoing user input, upon detecting a carriage return. As another example, the natural language input classification system 102 can detect that an ongoing user input trigger is activated upon the user entering or speaking more than a threshold number of characters or words. Still further examples of determining that an ongoing user input trigger is activated include determining a pause in the continuous detection of the user input, an input rate change association user input, a specific character identified within the user input, a keyword identified within the user input, and/or grammatic or syntactic characteristics of the user input. Upon detecting an activated user input trigger, the natural language input classification system 102 can proceed to act 310 of identifying the natural language input as explained below.

In response to determining that the received user input is ongoing (e.g., "Yes" in the act 304) and that an ongoing user input trigger is not activated, the natural language input classification system 102 can set a state associated with the client device 112 to "composing" in act 306. In one or more embodiments, in order to efficiently process instances of natural language input and generate conversational responses for the client device 112, the natural language input classification system 102 sets and tracks chat states associated with the client device 112. For example, the natural language input classification system 102 can set and track chat states including a "composing" state and an "active" state. In at least one embodiment, the natural language input classification system 102 sets a chat state associated with the client device 112 to "composing" in response to determining that the user of the client device 112 is still inputting content (e.g., "Yes" in the act 304). In at least one embodiment, the practical effect of a "composing" state is that it signals to the natural language input classification system 102 that the user is still inputting a question, thought, or statement, and that additional time is required to complete the natural language input prior to identifying and/or classifying the natural language input. As will be further discussed below, the natural language input classification system 102 can set the chat state associated with the client device 112 to "active" in response to determining that the user input is no longer ongoing (e.g., the typing has stopped) and that a trigger has been activated relative to the user input.

After setting the chat state associated with the client device 112 to "composing" in the act 306, the natural language input classification system 102 can again receive user input. In one or more embodiments, the natural language input classification system 102 can perform the loop of the acts 302, 304, and 306 regularly until ongoing input is no longer detected or has clearly stopped (e.g., the user has entered a carriage return and not typed another character for a threshold number of milliseconds). For example, the natural language input classification system 102 can perform the loop of the acts 302, 304, and 306 every three seconds in order to capture all the content currently inputted by the user—even if the natural language input classification system 102 has already classified a natural language input and/or provided a response to the user who is providing the user input, as in the act 302.

In response to detecting that the user input is no longer ongoing (e.g., "No" in the act 304) or has clearly stopped, the natural language input classification system 102 can determine whether an input trigger associated with the user input is detected in act 308. In one or more embodiments, the natural language input classification system 102 identifies an instance of natural language input to process within received user input in response to detecting an activated input trigger associated with the user input. By waiting until an activated input trigger is detected, the natural language input classification system 102 increases the likelihood that a subsequent instance of natural language input identified within the user input will contain an actionable intent.

In one or more embodiments, the natural language input classification system 102 can detect various types of activated input triggers associated with the received user input. For example, the natural language input classification system 102 can detect an activated input trigger including a pause in the ongoing user input. Specifically, the natural language input classification system 102 can detect a pause of a predetermined length of time (e.g., 3 seconds) associated with the user input. To illustrate, a user may pause typing on the client device 112 for long enough to satisfy the inquiry in the act 304 (e.g., 1 second). The natural language input classification system 102 may further detect that the pause continues until the pause activates an input trigger associated with the user input in the act 308.

The natural language input classification system 102 can also detect an activated input trigger including an input rate change associated with the ongoing user input. For example, the natural language input classification system 102 can determine an input rate associated with the received user input (e.g., one hundred words per minute, three characters per second). In one or more embodiments, the natural language input classification system 102 can determine that an input trigger associated with the user input is activated when the input rate associated with user input changes by more than a threshold percentage. For instance, the natural language input classification system 102 can determine that the input trigger associated with the user input is activated when the input rate associated with the user input decreases by more than twenty percent. In at least one embodiment, the natural language input classification system 102 can detect a pause in the user input that is long enough to satisfy the inquiry in the act 304, but not long enough to qualify as an input rate change that causes activation of an input trigger associated with the user input.

Additionally, the natural language input classification system 102 can detect an activated input trigger including one or more specified characters within the user input. For example, the natural language input classification system 102 can analyze the received user input to identify at least one specified character such as, but not limited to, a carriage return, a period, a comma, or an emoticon (e.g., an angry face, a smiley face). In at least one embodiment, natural language input classification system 102 can determine that the input trigger associated with the user input is activated in response to identifying multiple specified characters, or in response to identifying a combination of specified characters.

Moreover, the natural language input classification system 102 can detect an activated input trigger including one or more predefined keywords. For example, the natural language input classification system 102 can analyze the received user input to identify keywords that indicate a heightened customer service problem. For instance, in response to identifying a keyword "delete" (e.g., which may indicate a failure-level problem with an application), the natural language input classification system 102 can determine that the input trigger associated with the user input is activated. In another example, in response to identifying an obscenity indicating frustration, the natural language input classification system 102 can determine that the input trigger associated with the user input is activated.

Furthermore, the natural language input classification system 102 can detect an activated input trigger including grammatic and/or syntactic characteristics associated with the user input. For example, the natural language input classification system 102 can perform a grammatical or syntactical analysis of the received user input (e.g., utilizing one or more computer models) to determine whether the user input is grammatically and/or syntactically complete. For instance, the natural language input classification system 102 can determine that the user input includes both a noun and verb. In at least one embodiment, the natural language input classification system 102 can determine that the input trigger associated with the user input is activated if the user input is grammatically and/or syntactically complete. Additionally or alternatively, the natural language input classification system 102 can determine that the input trigger associated with the user input is activated in response to identifying predefined patterns of parts of speech.

In one or more embodiments, the natural language input classification system 102 may determine that the input trigger associated with the user input is activated after a combination of the techniques described above occurs. For example, the natural language input classification system 102 can utilize one or more heuristics and/or machine learned ways of combining signals described above to determine whether there is sufficient user input to constitute a. Thus, one signal, such as the presence of a particular keyword, may augment another signal, such as a pause in the user input.

If the natural language input classification system 102 determines in act 308 that an input trigger associated with the user input is not activated (e.g., "No" in the act 308), the natural language input classification system 102 can again perform the act 302 of receiving user input, as discussed above. For example, the natural language input classification system 102 can continue to receive user input in combination with the already received user input (e.g., the user input including the detected pause in the act 304). In this way, the natural language input classification system 102 can continuously receive a body of user input until there is both a pause in the user input and an activated trigger associated with the user input.

In response to determining in the act 308 that an input trigger associated with the user input is activated (e.g., "Yes" in the act 308) or in response to determining in act 305 that an ongoing user input trigger is activated (e.g., "Yes" in the act 305, the natural language input classification system 102 can perform an act 310 of identifying the natural language input within the user input. In one or more embodiments, the natural language input classification system 102 identifies the instance of natural language input to process as the body of the user input received in the current iteration of the process illustrated in FIG. 3 (e.g., the user input detected from the user input was initial detected until the activated trigger was detected). Additionally or alternatively, the natural language input classification system 102 can identify the an instance of natural language input to process as a portion or fragment of the user input that is grammatically or syntactically complete. In other words, the natural language input classification system 102 may clear out or remove emoticons, greetings, and other incomplete portions of the user input in order to identify one or more instance of natural language input to process.

The natural language input classification system 102 can also perform an act 312 of setting a chat state associated with the client device 112 to "Active." In one or more embodiments, the natural language input classification system 102 sets and tracks chat states associated with the client device 112 so as to efficiently aid in determining when to process instances of natural language input and generate responses that are both accurate to determined intent classification and are conversational from the standpoint of the user of the client device 112. In at least one embodiment, the natural language input classification system 102 sets a state associated with the client device 112 to "active" in response to determining that the received user input is at a point where a response from the natural language input classification system 102 is appropriate.

As further shown in FIG. 3, the natural language input classification system 102 can further perform the act 314 of sending the identified instance of natural language input for processing. For example, the natural language input classification system 102 can cause the language processing application 116 to provide the identified natural language input to the natural language input classification system 102 on the server(s) 106. Alternatively, if the natural language input classification system 102 is analyzing a received user input stream on the server(s) 106, the natural language input classification system 102 can directly begin processing the identified instance of natural language input in the act 314. Additionally, in the act 314, the natural language input classification system 102 can track the current chat state associated with the client device 112. After performing the act 314, the natural language input classification system 102 may detect additional user input. In response to detecting additional user input, the natural language input classification system 102 can again perform the act 302 and again begin the cycle of acts illustrated in FIG. 3.

Figure 4:
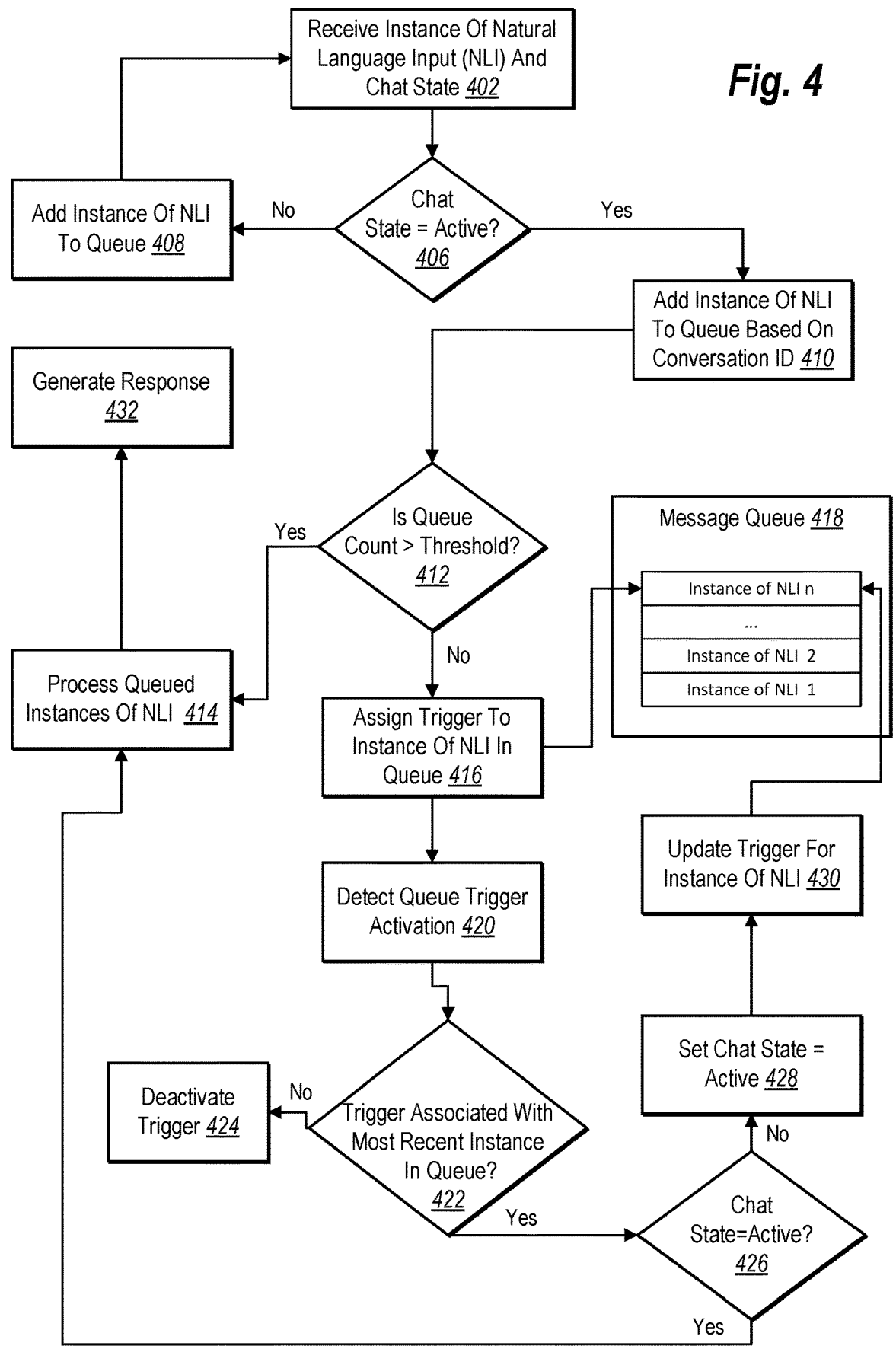
FIG. 4 illustrates a state diagram of processing instances of natural language input in a message queue in accordance with one or more embodiments.

As mentioned above, the natural language input classification system 102 processes instances of natural language input for intent classifications and generates conversational responses based on those intent classifications. FIG. 4 illustrates additional detail regarding the process by which the natural language input classification system 102 groups and processes instances of natural language input. As with the process illustrated in FIG. 3, the natural language input classification system 102 can perform the acts illustrated in FIG. 4 on the server(s) 106 or on the client device 112 via the language processing application 116.

As shown in FIG. 4, the natural language input classification system 102 can perform an act 402 of receiving an instance of natural language input and a chat state indicator associated with the client device 112 (e.g., from the client device in response to the acts described in reference to FIG. 2). For example, as discussed above with reference to FIG. 3, the natural language input classification system 102 can identify an instance of natural language input within a user input and set and track a chat state associated with the client device 112. In one or more embodiments, the instance of natural language input can be a phrase, a statement, a sentence, a sentence fragment, or even a single word. The state indicator can comprise a label or chat state describing a current input function of a client device. For example, as described above, the natural language input classification system can set a "composing" chat state indicator in association with a client device in response to detecting continuous user input (e.g., typing) from the client device. Additionally, the natural language input classification system can set an "active" chat state indicator in association with the client device in response to detecting that the user has stopped typing and that an input trigger is activated indicating that the user input includes one or more instance of natural language input that should be processed for an intent classification.

The natural language input classification system 102 can further perform an act 406 of determining whether the chat state associated with the client device 112 is "active" based on the state indicator received with the instance of natural language input. For example, as discussed above, the natural language input classification system 102 can assign and track various chat states associated with the client device 112 depending on the user input. For instance, the natural language input classification system 102 can assign a "composing" chat state to the client device 112 in response to detecting continuously provided user input (e.g., while the user is typing). The natural language input classification system 102 can further assign an "active" chat state to the client device 112 in response to detecting a pause in the user input of sufficient length and an activated input trigger associated with the user input.

If the natural language input classification system 102 determines that the current chat state is not "active" (e.g., "No" in the act 406), the natural language input classification system 102 can perform an act 408 of adding the instance of natural language input to a message queue based on a conversation identifier. For example, the natural language input classification system 102 can determine the conversation identifier based on the client device 112, such that instances of natural language input coming from the client device 112 during a threshold amount of time (e.g., five minutes) are assigned the same conversation identifier. In one or more embodiments, the natural language input classification system 102 can add the instance of natural language input to the back of a message queue (e.g., behind any other instances of natural language input already in the message queue) along with the conversation identifier. Alternatively, the natural language input classification system 102 can add the instance of natural language input to the message queue according to a different queuing algorithm or methodology. If the message queue is currently empty, the natural language input classification system 102 can add the instance of natural language input to the first slot in the message queue. After performing the act 408, the natural language input classification system 102 can again perform the act 402 of receiving a next instance of natural language input and updated chat state associated with the client device 112.

If the natural language input classification system 102 determines that the current chat state is "active" (e.g., "Yes" in the act 406), the natural language input classification system 102 can perform an act 410 of adding the instance of natural language input to the message queue based on the conversation identifier, similar to the act 408. But with the current chat state as "active," the natural language input classification system 102 can perform the act 412 of determining whether the message queue count is greater than a predetermined threshold number. For example, the message queue may hold any number of instances of natural language input, but the natural language input classification system 102 may operate under a heuristic dictating that all instances of natural language input in the message queue should be processed when the number of instances of natural language input in the message queue reaches a predetermined threshold. To illustrate, the natural language input processing system 102 may determine to process all instances of natural language input in the message queue when the number of instances of natural language input in the message queue is greater than five instances of natural language input or the natural language input has been queued for a pre-determined amount of time (e.g., one minute). In response to determining that the message queue count is greater than a predetermined threshold (e.g., "Yes" in the act 412), and as will be discussed in greater detail below, the natural language input classification system 102 can perform an act 414 of processing one or more queued instances of natural language input from the message queue.

In response to determining that the message queue count is not greater than the predetermined threshold (e.g., "No" in the act 412), the natural language input classification system 102 can perform an act 416 of assigning a queue trigger to the newly added instance of natural language input in the message queue 418. For example, as shown in FIG. 4, the message queue 418 can include multiple instances of natural language input. Each slot in the message queue 418 can store an instance of natural language input, and a queue trigger associated with the instance of natural language input. In one or more embodiments, only a subset of the instances of natural language input in the message queue 418 have been assigned queue triggers.

The natural language input classification system 102 can assign a queue trigger to the newly added instance of natural language input in various ways. For example, the natural language input classification system 102 can assign a time elapse queue trigger to the instance of natural language input in the message queue. In one or more embodiments, the time elapse queue trigger becomes activated when a predetermined amount of time (e.g., two seconds) elapses starting when the time elapse queue trigger is assigned. In another example, the natural language input classification system 102 can assign a character limit queue trigger to the instance of natural language input in the message queue. In one or more embodiments, the character limit queue trigger becomes activated when a number of characters in the instance of natural language input is greater than a predetermined number. For example, the character limit queue trigger can become immediately activated upon assignment when the number of characters in the instance of natural language input is greater than the predetermined number.

As further shown in FIG. 4, the natural language input classification system 102 can perform an act 420 of detecting a queue trigger activation. For example, as discussed above, the natural language input classification system 102 can detect the activation of a time elapse queue trigger and/or the activation of a character limit queue trigger. In one or more embodiments, the natural language input classification system 102 can detect the activation of a queue trigger associated with any of the instances of natural language input in the message queue 418, even if the activated queue trigger is not associated with the most recently added instance of natural language input in the message queue 418.

After detecting the activated queue trigger, the natural language input classification system 102 can perform an act 422 of determining whether the instance of natural language input associated with the activated queue trigger is the most recent instance of natural language input (e.g., the highest instance of natural language input) added in the message queue 418. For example, as mentioned above, the natural language input classification system 102 configures the message queue 418 as a first-in-first-out queue where the oldest instance of natural language input in the message queue 418 is the first, highest, or "most recently added" instance of natural language input in the message queue 418. Accordingly, the natural language input classification system 102 can determine whether the activated instance of natural language input (i.e., the instance of natural language input associated with the activated queue trigger) is the most recently added to the message queue 418 based on the queue position of the activated instance of natural language input and/or the length of time the activated instance of natural language input has been in the message queue 418.

In response to determining that the activated instance of natural language input (i.e., the instance of natural language input associated with the activated queue trigger) is not the most recently added instance of natural language input in the message queue 418 (e.g., "No" in the act 422), the natural language input classification system 102 can perform an act 424 of deactivating the queue trigger associated with the activated instance of natural language input. For example, the natural language input classification system 102 can remove or delete the queue trigger. In one or more embodiments, the natural language input classification system 102 does not remove the instance of natural language input from the message queue 418, but rather keeps the instance of natural language input in an unchanged queue position within the message queue 418. In at least one embodiment, the effect of deactivating the queue trigger in act 424 is that the associated instance of natural language input is processed later when either a queue trigger associated with a higher positioned instance of natural language input activates, or when the number of instances of natural language input in the message queue 418 exceeds the threshold number.

In response to determining that the activated instance of natural language input is the most recently added instance of natural language input in the message queue 418 (e.g., "Yes" in the act 422), the natural language input classification system 102 can perform an act 426 of determining whether the current chat state associated with the client device 112 is "active." If the current chat state associated with the client device 112 is still "active" (e.g., "Yes" in the act 426), and as will be discussed further below, the natural language input classification system 102 can perform the act 414 of processing the instances of natural language input in the message queue 418. If the current chat state associated with the client device 112 is not "active" (e.g., "No" in the act 426), the natural language input classification system 102 can perform an act 428 of setting the chat state associated with the client device 112 to "active." In one or more embodiments, determining that the current chat state associated with the client device 112 is not "active" in the act 426 means that the user of the client device 112 has again begun providing user input in the time since the natural language input classification system 102 received an instance of natural language input in the act 402. Accordingly, the natural language input classification system 102 can reset the chat state associated with the client device 112 to "active" such that there is an increased likelihood that the message queue 418 is processed in an updated threshold amount of time.

For example, the natural language input classification system 102 can perform an act 430 of updating the queue trigger associated with the activated instance of natural language input. In one or more embodiments, the natural language input classification system 102 can update the queue trigger to have a new elapsed time limit (e.g., four seconds). For instance, the natural language input classification system 102 can update the queue trigger within the message queue 418 in association with the activated instance of natural language input.

If the current chat state associated with the client device 112 is still "active" (e.g., "Yes" in the act 426), the natural language input classification system 102 can perform the act 414 of processing the instances of natural language input in the message queue 418. For example, the natural language input classification system 102 can process one or more of the instances of natural language input in the message queue 418, including the activated instance of natural language input. In one or more embodiments, the natural language input classification system 102 can process the instances of natural language input in the message queue 418 to determine an intent classification for the instances of natural language input.

The natural language input classification system 102 can process the instances of natural language input for intent classifications in various ways. For example, the natural language input classification system 102 can utilize keyword analysis, syntax analysis, or other natural language processing. For instance, the natural language input classification system 102 can generate one or more input vectors for each instance of natural language input and provide the generated one or more input vectors to a natural language processing model. The natural language input classification system 102 can receive, from the natural language processing model, at least one intent classification associated with each grouping of instances of natural language input.

In response to receiving the intent classification(s) for the instances of natural language input in the now cleared message queue 418, the natural language input classification system 102 can perform an act 432 of generating one or more responses based on the determined intent classification(s) and instances of natural language input. For example, as will be discussed in greater detail below with regard to FIGS. 6A-6B, the natural language input classification system 102 can generate natural language electronic messages for inclusion in a chat thread between a client device user and the language processing system 104. In at least one embodiment, the natural language input classification system 102 generates an electronic message including one or more of: natural language, selectable message elements (e.g., a hyperlink), or additional information associated with a determined intent classification.

In one or more embodiments, the natural language input classification system 102 utilizes one or more computer models to determine an intent classification associated with a grouping of one or more instances of natural language input. In at least one embodiment, the natural language input classification system 102 utilizes a natural language processing model, such as a sequence-to-sequence neural network, to determine intent classifications.

In one or more embodiments, the natural language input classification system can determine an intent for a grouping of instances of natural language input utilizing a computer model, such as a neural network model. A neural network model refers to a machine learning model that can be tuned (e.g., trained) based on inputs to approximate unknown functions. In particular, the term neural network can include a model of interconnected artificial neurons (or layers) that communicate and learn to approximate complex functions and generate outputs based on a plurality of inputs provided to the model. In particular, a neural network includes a computer-implemented algorithm that implements deep learning techniques to analyzes input (e.g., training input encoded as a neural network input vector) to make predictions and that improves in accuracy by comparing generated predictions against ground truth data and modifying internal parameters for subsequent predictions. In some embodiments, a neural network can employ supervised learning, while in other embodiments a neural network can employ unsupervised learning or reinforced learning. Examples of neural networks include deep convolutional neural networks, generative adversarial neural networks, and recurrent neural networks.

A recurrent neural network refers to a type of neural network that performs analytical tasks on sequential elements and analyzes individual elements based on computations (e.g., latent feature vectors) from other elements. In particular, a recurrent neural network includes an artificial neural network that uses sequential information associated with words in a text input (e.g., a sentence), and in which an output of a current word is dependent on computations (e.g., latent feature vectors) for previous words.

Furthermore, as used herein, a long short-term memory neural network or LSTM neural network refers to a type of recurrent neural network capable of learning long-term dependencies in sequential information. Specifically, an LSTM neural network can include a plurality of layers that interact with each other to retain additional information between LSTM units (e.g., long short-term memory units that are layers of the neural network for analyzing each sequential input, such as each word) of the network in connection with a state for each LSTM unit. An LSTM state refers to a component of each LSTM unit that includes long-term information from previous LSTM units of the LSTM neural network. The LSTM neural network can update the LSTM state for each LSTM unit (e.g., during an update stage) by using the plurality of layers to determine which information to retain and which information to forget from previous LSTM units. The LSTM state of each LSTM unit thus influences the information that is retained from one LSTM unit to the next to form long-term dependencies across a plurality of LSTM units.

In at least one embodiment, the natural language input classification system determines an intent classification for a grouping of instance(s) natural language input with an NLP model such as a sequence-to-sequence neural network. For example, a sequence-to-sequence neural network can include encoder and decoder layers of LSTM neural networks. In one or more embodiments, the encoder LSTM neural network layer can take a grouping of instance(s) natural language input as an input and embed the natural language input into a fixed sequence vector. The decoder LSTM neural network layer can receive the sequence vector and output one or more embedded sequences including a predicted intent classification.

Figure 5A:
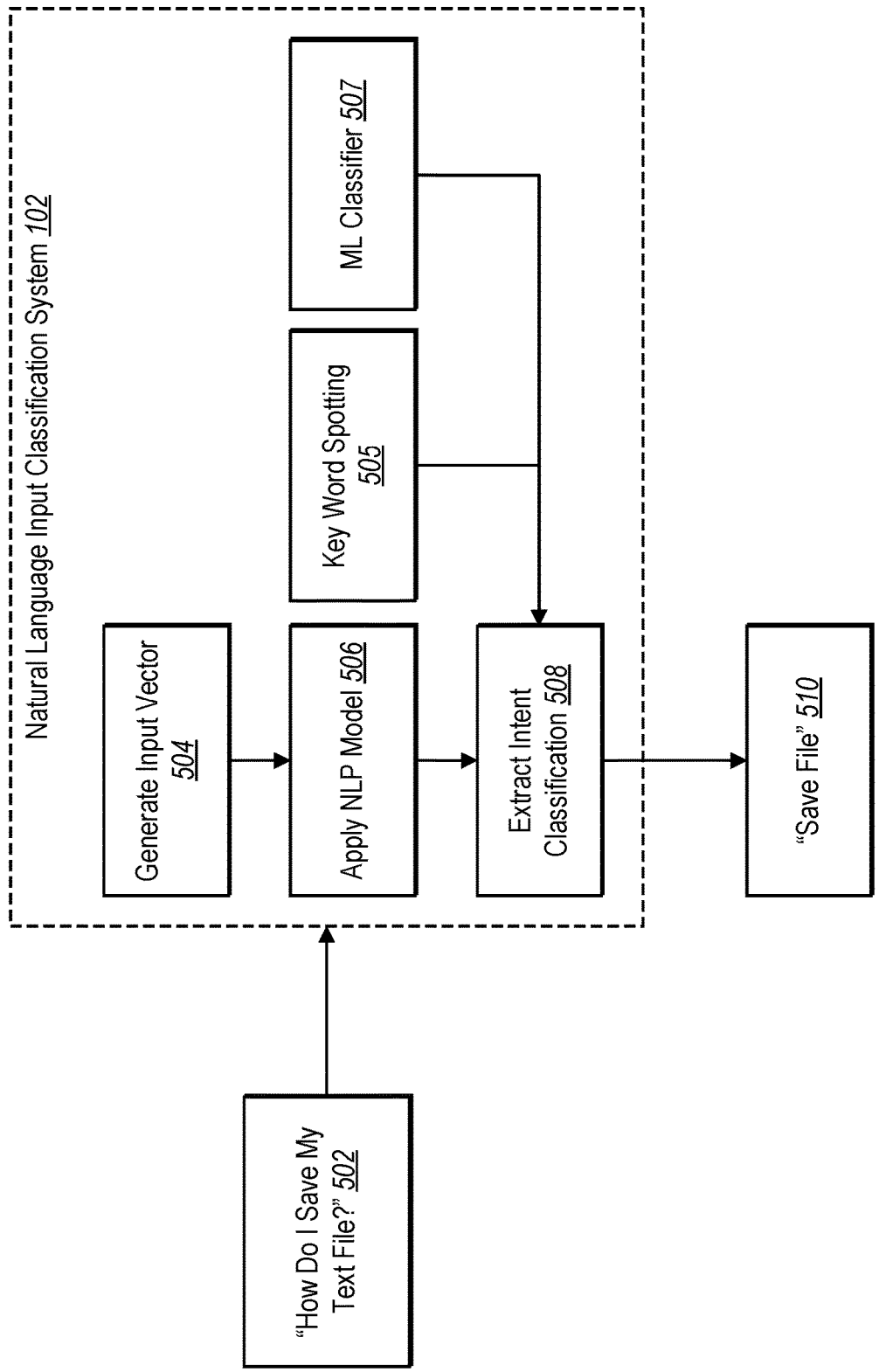
FIG. 5A illustrates a diagram of a process of determining an intent classification associated with a natural language input in accordance with one or more embodiments.
Figure 5B:
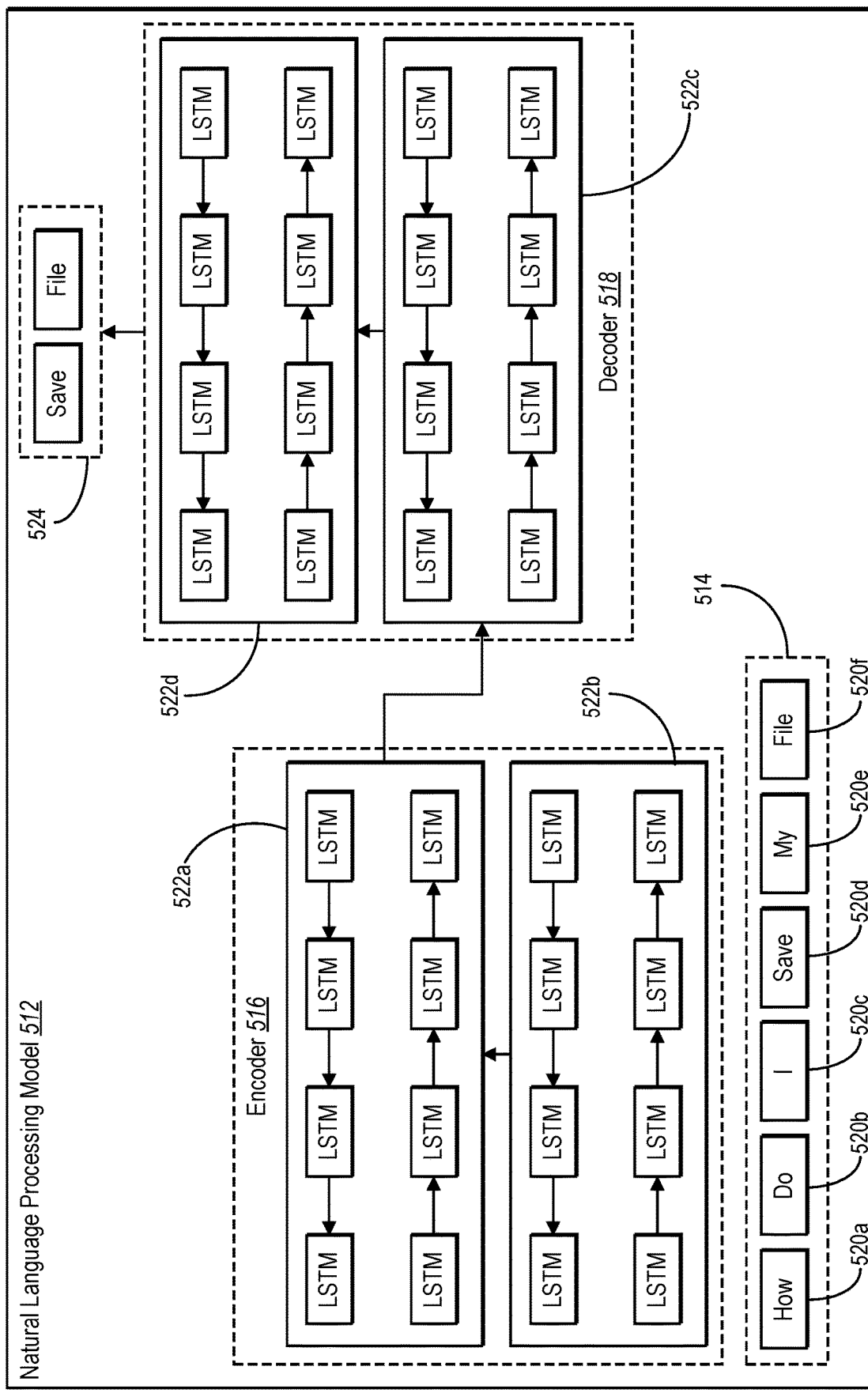
FIG. 5B illustrates a schematic diagram of a natural language processing model in accordance with one or more embodiments.

FIGS. 5A-5B illustrate additional detail with regard to how the natural language input classification system 102 can utilize a natural language processing model to determine an intent classification based on a grouping of instance(s) of natural language input. For instance, FIG. 5A illustrates additional detail with regard to identifying and extracting an intent classification in accordance with one or more embodiments. Specifically, FIG. 5A shows the natural language input classification system 102 identifying the natural language input 502 "How do I save my text file?". In one or more embodiments, the natural language input classification system 102 identifies the natural language input 502 from user input detected from the client device 112 (e.g., as shown in FIG. 1). Thus, the natural language input classification system 102 can receive the natural language input 502 as part of a communication thread, an email, an SMS text message, a digital audio input, or other similar electronic communication.

In response to identifying the natural language input 502, the natural language input classification system 102 can utilize a natural language processing model to extract or identify an intent classification from the grouping of instance(s) of natural language input. NLP models can comprise neural network based models as described in reference to acts 504-508 or non-deep learning models such as key word spotting, template matching, a machine learning classifier, or a regression algorithm. Furthermore, as shown by FIG. 5A, in one or more implementations, the natural language input classification system 102 can utilize one or more NLP models and combinations thereof. For example, the natural language input classification system 102 can utilize a hybrid system that combines a deep learning NLP model and one or more non-deep learning NLP models. In cases in which the natural language input classification system 102 utilizes multiple NLP models, the natural language input classification system 102 can feed the output of one model as input to another model, can utilize a voting procedure or logic based selection methods to determine which classification to utilize if different NLP models provide classify a grouping of instance(s) of natural language input differently.

In one or more implementations including a deep-learning based NLP model, the natural language input classification system 102 performs an act 504 of generating one or more input vectors based on the grouping of instance(s) of natural language input 502. For example, in one or more embodiments, the natural language input classification system 102 generates an input vector by encoding information from the natural language input 502 into a fixed-length vector representation. In at least one embodiment, the natural language input classification system 102 generates the input vector by parsing the natural language input 502 into separate words and embedding the words into the fixed-length input vector. Alternatively, the natural language input classification system 102 can parse the natural language input 502 into separate words and then generate an input vector for each word.

Next, the natural language input classification system 102 performs an act 506 of applying a NN NLP model to the generated input vector. For example, the natural language input classification system 102 can apply NN NLP model to the natural language input 502 by feeding the one or more generated input vectors into the NN NLP model. As mentioned above, the NN NLP model outputs a predicted intent classification associated with a grouping of instance(s) of natural language input. As such, the result of the act 506 is a predicted intent classification associated with the inputted grouping of instance(s) of natural language input.

In one or more implementations including a non-deep-learning based NLP model, the natural language input classification system 102 performs an act 505 of key word spotting. For example, the natural language input classification system 102, upon detecting one or more key words or a sequence of key words in the natural language input can generate a predicted intent classification. Still further, the natural language input classification system 102 can perform an act 507 of processing the natural language input with a machine learning (ML) classifier 507 to determine a predicted intent classification. For example, the ML classifier 507 can perform various analytical techniques to classify an intent of the, such as stemming, lemmatizing, vectorizing, using term frequency-inverse document frequency (TF-IDF) or other techniques.

With the predicted intent classification associated with the natural language input 502 (based on a NN NLP model, a non-deep-learning NLP, a hybrid NLP model, or a combination of NLP models), the natural language input classification system 102 can perform an act 508 of further extracting the intent classification. For example, the natural language input classification system 102 can analyze the predicted intent classification to match the predicted intent classification to a known intent classification (e.g., based on a repository of know intent classifications). The natural language input classification system 102 can then output the known intent classification 510 (e.g., "Save File").

As discussed above, in one or more embodiments, the natural language input classification system 102 utilizes a deep-learning (DL) based natural language processing model (e.g., an NLP model) to determine intent classifications associated with instances of natural language input. For instance, FIG. 5B illustrates an example architecture of a DL NLP model 512 in accordance with one or more embodiments. Specifically, FIG. 5B shows an encoder layer 516 and a decoder layer 518 of the DL NLP model 512.

As mentioned above, the encoder layer 516 of the DL NLP model 512 receives a text input 514 (e.g., the natural language input 502 shown in FIG. 5A) and parses the text input 514 into words, characters, or character n-grams 520a-520f. In one or more embodiments, the natural language input classification system 102 then embeds the words, characters, or character n-grams 520a-520f into one or more input vectors of fixed length. For example, the natural language input classification system 102 can encode the words 520a-520f utilizing one-hot encoding, or a neural embedding based on word semantics. The natural language input classification system 102 can then feed the one or more generated input vectors to one or more additional layers of the DL NLP model 512.

For example, in one or more embodiments, the natural language input classification system 102 feeds the generated input vector for each word in the text input 514 to the encoder layer 516 including multiple bi-directional LSTM layers 522a, 522b. As shown in FIG. 5B, the two-layered bi-directional LSTM layers 522a, 522b of the encoder layer 516 can each include a first layers and second layers. In at least one embodiment, the first and second layers include series of LSTM units that are organized bi-directionally. In one or more embodiments, the bi-directional organization divides the LSTM units into two directions. For example, half of the LSTM units are organized 'forward,' or in a sequence over increasing sequence instances, while the other half of the LSTM units are organized 'backward,' or in a sequence over decreasing sequence instances. By organizing the LSTM units in opposite directions, the encoder layer 516 can simultaneously utilize content information from the past and future of the current sequence instance to inform the output of the encoder layer 516.

Generally, each LSTM unit includes a cell, an input gate, an output gate, and a forget gate. As such, each LSTM unit can "remember" values over arbitrary time intervals while regulating the flow of information into and out of the unit. Thus, for example, a first LSTM unit in the first layer of the encoder layer 516 can analyze an input vector encoding the word 520a (e.g., "How"). A second LSTM unit in the first layer can analyze an input vector encoding the word 520b (e.g., "do") as well as a feature vector from the first LSTM unit (e.g., a latent feature vector encoding significant features of the word "How" or other previous words in the sequence).

The organization illustrated in FIG. 5B enables the encoder layer 516 to sequentially model the text input, where latent feature vectors of previous layers (corresponding to previous text inputs and training text inputs) are passed to subsequent layers, and where hidden states of text inputs are obtained to generate vectors for each word 520a-520f embedded into the input vector. Each of the layers of the encoder layer 516 further determine relationships between words embedded into the input vector and other contextual information to generate output vectors.

For example, the encoder layer 516 of the DL NLP model 512 can output a sequence vector that feeds directly into the decoder layer 518. As shown in FIG. 5B, the decoder layer 518 is configured similarly to the encoder layer 516 with multiple bi-directional LSTM layers 522c, 522d. In response to receiving the sequence vector from the encoder layer 516, the layers 522c, 522d of the decoder layer 518 can output a predicted intent classification 524.

Figure 6C:
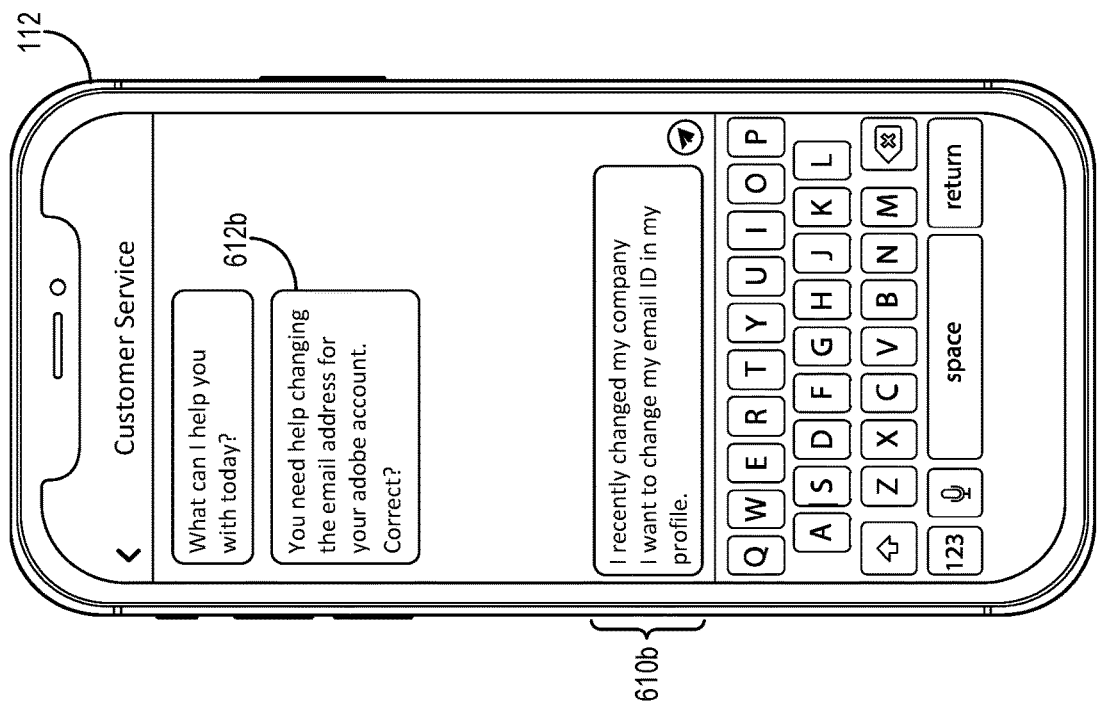

As mentioned above, the natural language input classification system 102 can generate one or more responses based on a determined intent classification associated with a grouping of instance(s) of natural language input. FIGS. 6A-6C illustrate additional detail with regard to the natural language input classification system 102 generating such responses. For example, as shown in FIG. 6A, the natural language input classification system 102 can provide a chat interface 602 via the chat application 114, wherein a user of the client device 112 can engage in back-and-forth communication with the language processing system 104. As further shown in FIG. 6A, the natural language input classification system 102 can configure the chat interface 602 with a communication thread area 604, a touch screen keyboard 606, and a user input box 608. Additionally, the natural language input classification system 102 can initialize the chat interface 602 to include a communication prompt 609 in the communication thread area 604.

As further illustrated in FIG. 6B, the natural language input classification system 102 can detect continuously provided user input. For example, the natural language input classification system 102 can detect user input 610a typed into the user input box 608 via the touch screen keyboard 606. As discussed above, the natural language input classification system 102 can detect the user input 610a as a stream of character selections via the touch screen keyboard 606. As further discussed above, in response to detecting the user input 610a, the natural language input classification system 102 determine a state associated with the client device 112 (e.g., "active" due to the continuous typing). The natural language input classification system 102 can further identify a grouping of instance(s) of natural language input within the user input 610a based on the current state of the client device 112, and one or more input triggers associated with the user input 610a (e.g., pauses in typing, a typing rate change, a special character in the user input 610a, one or more grammar tags in the user input 610a). For example, the natural language input classification system 102 can identify the grouping of instance(s) of natural language input as, "I recently changed my company."

Additionally, as discussed above, the natural language input classification system 102 can determine an intent classification associated with the natural language input identified within the user input 610a. For example, the natural language input classification system 102 can provide the instances of natural language input in a message queue associated with the current conversation to an NLP model depending on one or more of: the current state of the client device 112, the number of instances of natural language input in the current message queue, one or more queue triggers and instances of natural language input positions within the current message queue.

At the conversational point illustrated in FIG. 6B, the current message queue may only include the natural language input identified within the user input 610a. Thus, in response to processing the message queue, the natural language input classification system 102 may only process one instance of natural language input to receive a single intent classification. For example, the natural language input classification system 102 may not be able to determine an intent classification based on processing the instance of natural language input, "I recently changed my company" with an NLP model.

In one or more embodiments, the natural language input classification system 102 can generate a response in response to generating an intent classification. For example, as shown in FIG. 6B, the natural language input classification system 102 can generate and provide the electronic message 612a. In at least one embodiment, the natural language input classification system 102 can generate the electronic message 612a to include natural language and additional information correlated to the determined intent classification. For example, as shown in FIG. 6B, the natural language input classification system 102 can provide the electronic message 612a stating "I'm still learning. Could you describe the issue differently or tell me your goal?"

As discussed above, the natural language input classification system 102 can continuously detect ongoing user input and update conversational responses. For example, as shown in FIG. 6C, the natural language input classification system 102 can continue to detect the user input 610b (e.g., "I want to change my email ID in my profile."). In response to this continuously detected user input, in connection with the current state of the client device 112, one or more input triggers, queue triggers, and the number and position of instances of natural language input in an associated message queue, the natural language input classification system 102 can identify a grouping of instance(s) of natural language input within the user input 610b, and determine an intent classification associated with that grouping of instance(s) of natural language input (e.g., "I want to change my email ID in my profile"). As shown in FIG. 6C, the natural language input classification system 102 can generate the electronic message 612b directed to the determined intent classification, which states "You need help changing the email address for your Adobe account?" Furthermore, the natural language input classification system 102 can also generate a selectable icon or link to a webpage where the identified intent can be addressed. Such as, "click here to change your Adobe account email."

Figure 7:
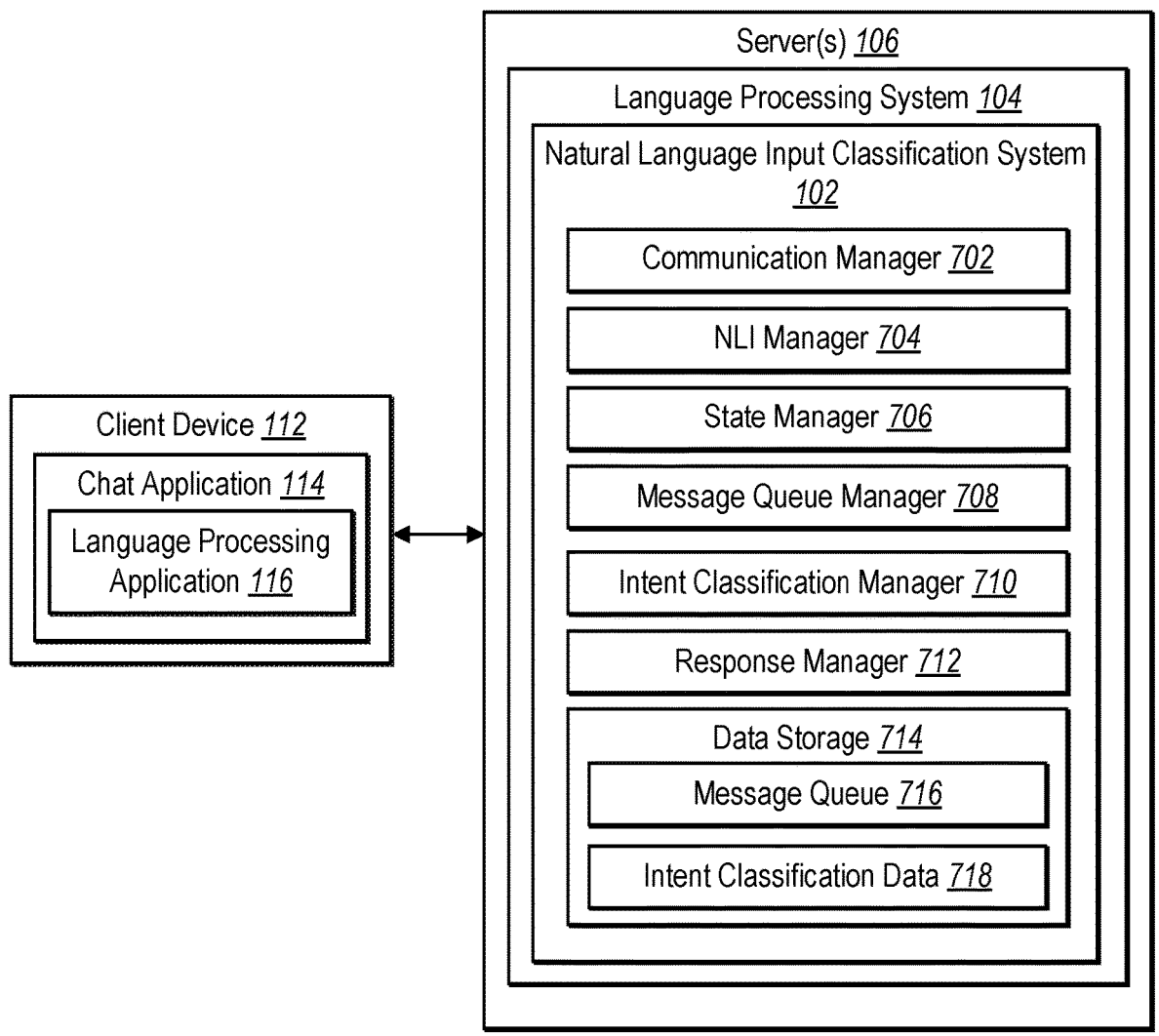
FIG. 7 illustrates a schematic diagram of the natural language input classification system in accordance with one or more embodiments.

As described in relation in FIGS. 1-6C, the natural language input classification system 102 performs operations for identifying grouping of instance(s) of natural language input and generating natural language responses. FIG. 7 illustrates a detailed schematic diagram of an embodiment of the natural language input classification system 102 described above. Although illustrated on the server(s) 106, as mentioned above, the natural language input classification system 102 can be implemented by one or more different or additional computing devices (e.g., the client device 112). In one or more embodiments, the natural language input classification system 102 includes a communication manager 702, a natural language input manager 704 (NLI Manager 704), a state manager 706, a message queue manager 708, an intent classification manager 710, a response manager 712, and a data storage 714 including one or more message queues 716 and intent classification data 718.

Each of the components 702-718 of the natural language input classification system 102 can include software, hardware, or both. For example, the components 702-718 can include one or more instructions stored on a computer-readable storage medium and executable by processors of one or more computing devices, such as a client device or server device. When executed by the one or more processors, the computer-executable instructions of the natural language input classification system 102 can cause the computing device(s) to perform the methods described herein. Alternatively, the components 702-718 can include hardware, such as a special-purpose processing device to perform a certain function or group of functions. Alternatively, the components 702-718 of the natural language input classification system 102 can include a combination of computer-executable instructions and hardware.

Furthermore, the components 702-718 of the natural language input classification system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-718 may be implemented as a stand-alone application, such as a desktop or mobile application. Furthermore, the components 702-718 may be implemented as one or more web-based applications hosted on a remote server. The components 702-718 may also be implemented in a suite of mobile device applications or "apps." To illustrate, the components 702-718 may be implemented in an application, including but not limited to ADOBE ANALYTICS CLOUD, such as ADOBE ANALYTICS, ADOBE AUDIENCE MANAGER, ADOBE CAMPAIGN, ADOBE EXPERIENCE MANAGER, and ADOBE TARGET and/or ADOBE CREATIVE CLOUD, such as ADOBE PHOTOSHOP, ADOBE LIGHTROOM, ADOBE ACROBAT, ADOBE ILLUSTRATOR, and ADOBE® INDESIGN. "ADOBE", "ANALYTICS CLOUD", "ANALYTICS", "AUDIENCE MANAGER", "CAMPAIGN", "EXPERIENCE MANAGER", "TARGET," "CREATIVE CLOUD," "PHOTOSHOP," "LIGHTROOM," "ACROBAT," "ILLUSTRATOR," and "INDESIGN" are either registered trademarks or trademarks of Adobe Systems Incorporated in the United States and/or other countries.

As mentioned above, and as shown in FIG. 7, the natural language input classification system 102 includes a communication manager 702. In one or more embodiments, the communication manager 702 handles communications between the natural language input classification system 102 and other computing devices. For example, the communication manager 702 can send and receive information to and from the client device 112. To illustrate, the communication manager 702 can receive a user input stream (e.g., a continuous keystroke stream) from the client device 112 and can send a generated response back to the client device 112 based on one or more determined intent classifications extracted from the user input. Additionally or alternatively, the communication manager 702 can send and receive information to and from other systems such as other natural language processing systems, analysis systems, database querying systems, and so forth.

As mentioned above, and as shown in FIG. 7, the natural language input classification system 102 also includes a natural language input manager 704. In one or more embodiments, the natural language input manager 704 detects ongoing user input from the client device 112. Additionally, the natural language input manager 704 identifies one or more activated input triggers associated with user input in response to a detected current "active" state associated with the client device 112. For example, as discussed above with reference to FIG. 3, the natural language input manager 704 can identify one or more activated triggers including a pause trigger, an input rate change trigger, a special character trigger, and a grammatic/syntactic trigger. Based on detecting one or more activated input triggers, the natural language input classification system 102 can identify a natural language input in the user input.

As mentioned above, and as shown in FIG. 7, the natural language input classification system 102 also includes a state manager 706. In one or more embodiments, the state manager 706 continually sets, updates, tracks, and monitors a state associated with the client device 112. For example, the state manager 706 can set the state associated with the client device 112 to "active" in response to the natural language input manager 704 identifying a natural language input in received user input. Furthermore, the state manager 706 can reset the state associated with the client device 112 to "composing" in response to detecting additional ongoing user input from the client device 112 (e.g., the user has begun typing again). The state manager 706 can further track the current state of the client device 112 such that instances of natural language input in a message queue associated with the client device 112 may be processed according to the current state.

As mentioned above, and as shown in FIG. 7, the natural language input classification system 102 also includes a message queue manager 708. In one or more embodiments, the message queue manager 708 maintains and utilizes one or more message queues. For example, the message queue manager 708 may initialize a new message queue in response to detecting a new conversation involving the client device 112. The message queue manager 708 can add instances of natural language input to a message queue, can add and delete additional information (e.g., a queue trigger) in association with a particular natural language input to a message queue, and can track a current number of instances of natural language input within a message queue. In at least one embodiment, the message queue manager 708 organizes message queues based on conversation identifiers correlating to particular client devices.

As mentioned above, and as shown in FIG. 7, the natural language input classification system 102 also includes an intent classification manager 710. In one or more embodiments, the intent classification manager 710 determines when to process instances of natural language input in a particular message queue. For example, the intent classification manager 710 can determine to process a message queue in response to: detecting a queue trigger activation associated with at least one of the instances of natural language input in the message queue, receiving confirmation of an active state associated with the corresponding client device, and determining that the activated natural language input is appropriately positioned within the message queue.

In response to determining to process a particular message queue, the intent classification manager 710 can utilize a natural language processing model to determine an intent classification for each natural language input in that message queue. For example, the intent classification manager 710 can generate and provide one or more input vectors to the natural language processing model, and receive intent classifications from the natural language processing model.

As mentioned above, and as shown in FIG. 7, the natural language input classification system 102 also includes a response manager 712. In one or more embodiments, the response manager 712 generates electronic message responses based on determined intent classifications. For example, the response manager 712 can generate one or more electronic messages including natural language and selectable message elements (e.g., hyperlinks). In one or more embodiments, the response manager 712 can generate one response based on a sequence of determined intent classifications. In another embodiment, the response manager 712 can generate one response based on a single determined intent classification. The response manager 712 can provide generated electronic messages (e.g., responses) to the client device 112 for inclusion in a communication thread between a user of the client device 112 and the language processing system 104. Additionally or alternatively, the response manager 712 can generate different types of responses, such as auditory responses and tactile responses (e.g., a vibration or other).

As mentioned above, and as shown in FIG. 7, the natural language input classification system 102 includes a data storage 714. As shown, the data storage 714 can include one or more message queues 716 (e.g., such as the message queue 418 illustrated in FIG. 4). Additionally, the data storage 714 can also include intent classification data 718. In one or more embodiments, the intent classification data 718 can include intent classification information, a natural language processing model, and intent classification training data.

Figure 8:
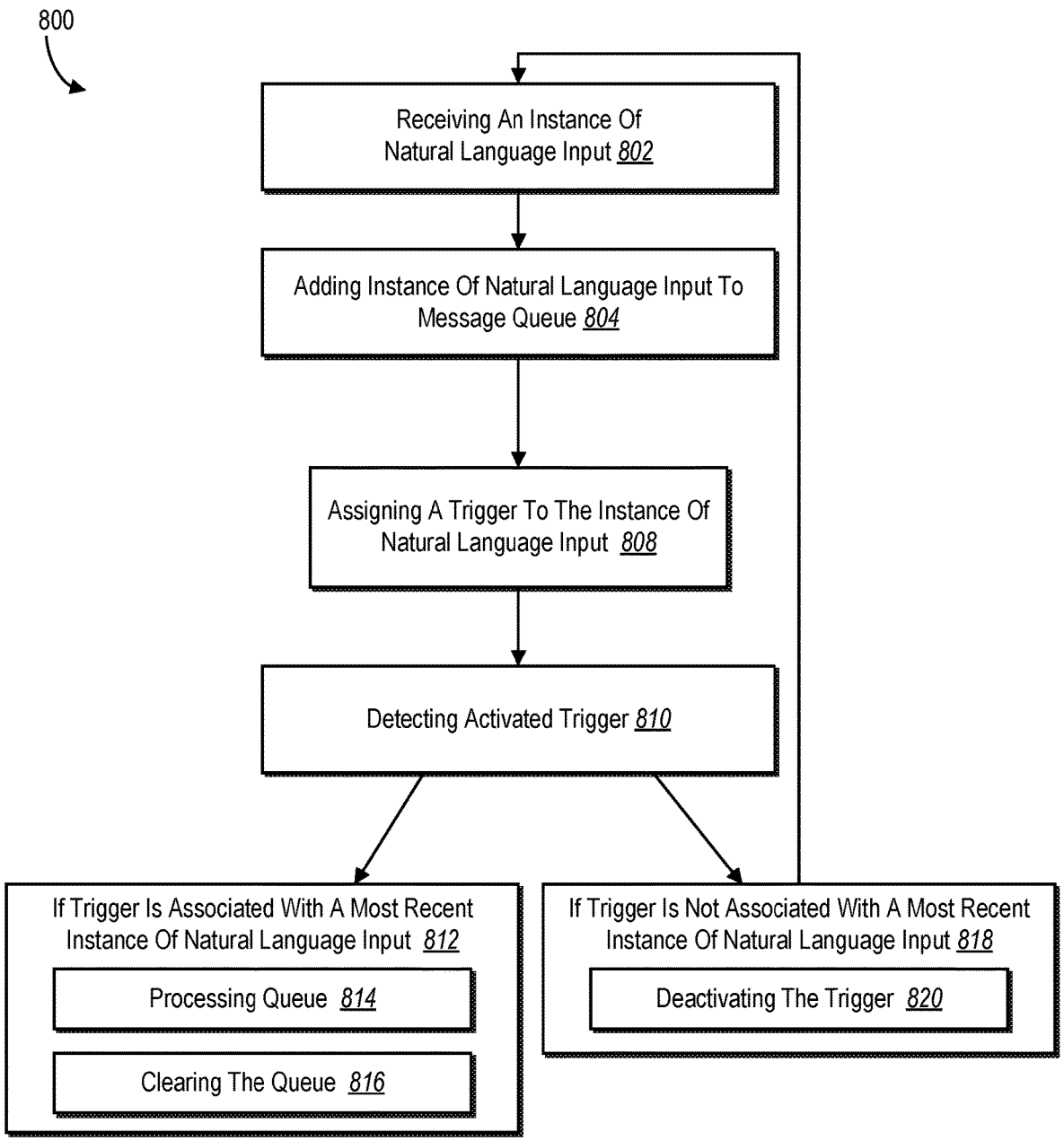
FIG. 8 illustrates a flowchart of processing instances of natural language input in a message queue in accordance with one or more embodiments.
Figure 9:
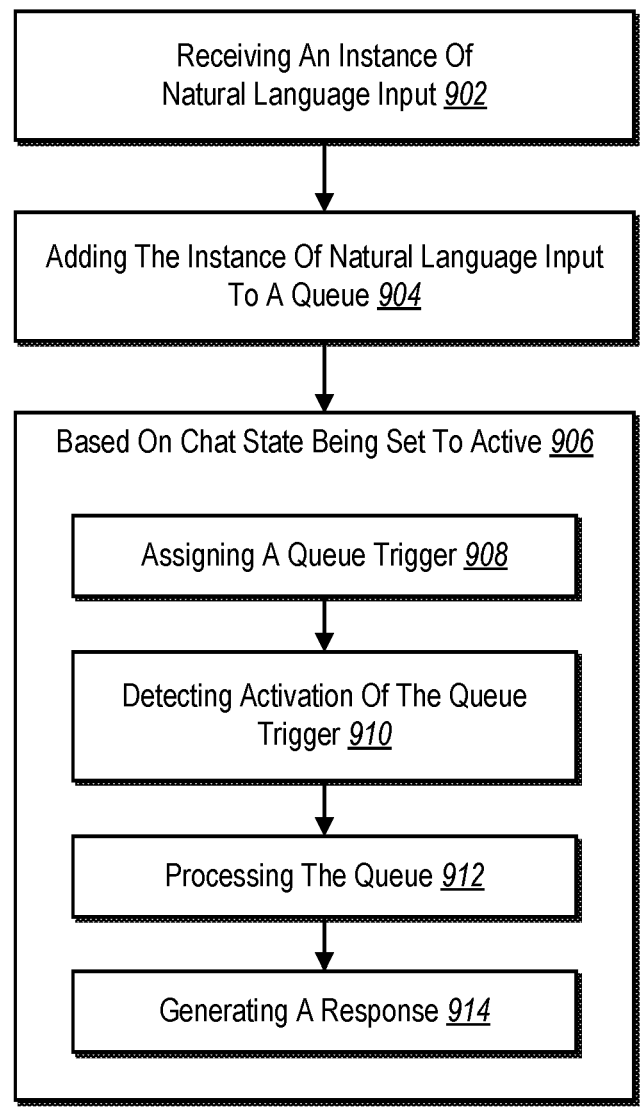
FIG. 9 illustrates a flowchart of generating one or more responses to instances of natural language input based on determined intent classifications in accordance with one or more embodiments.

FIGS. 1-7, the corresponding text, and the examples provide a number of different methods, systems, devices, and non-transitory computer-readable media of the natural language input classification system 102. In addition to the foregoing, one or more embodiments can also be described in terms of flowcharts comprising acts for accomplishing a particular result, as shown in FIGS. 8 and 9. FIGS. 8 and 9 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts 800 for processing instances of natural language input from a message queue in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 includes an act 802 of receiving an instance of natural language input. For example, the act 802 can involve receiving, from a client device, a an instance of natural language input and a chat state indicator indicating whether the client device is receiving ongoing user input.

As further shown in FIG. 8, the series of acts 800 includes an act 804 of adding the instance of natural language input to a queue. For example, the act 804 can involve adding the instance of natural language input to a message queue. As further shown in FIG. 8, the series of acts 800 includes an act 808 of assigning a trigger to the instance of natural language input. For example, act 808 can involve, in response to determining that the chat state indicator indicates that the client device not receiving ongoing user input and that a number instances of natural language input in the message queue is less than a predetermined threshold, assigning a queue trigger to the instance of natural language input. For example, act 808 can involve assigning a time elapse trigger to the instance of natural language input.

In one or more embodiments, the series of acts 800 includes an act of processing the instances of natural language input in the message queue utilizing the NLP model to determine intent classification(s) of the instances of natural language input in the message queue in response to determining that the current state indicator is active and that the number of instances of natural language input in the message queue is more than the predetermined threshold.

As further shown in FIG. 8, the series of acts 800 includes an act 810 of detecting an activated trigger. For example, the act 810 can involve detecting an activated queue trigger associated with the instance of natural language input. In one or more embodiments, act 810 can involve detecting the activated queue trigger comprises detecting that a predetermined amount of time has elapsed since the time elapse trigger was assigned to the instance of natural language input.

As further shown in FIG. 8, the series of acts 800 includes an act 812 of determining that the trigger is associated with a most recent instance of natural language input. For example, the act 812 can involve determining whether the activated queue trigger is associated with a most recently added instance of natural language input in the message queue. For example, the act 812 can involve, in response to determining that the activated queue trigger is associated with a most recent instance of natural language input in the message queue: processing instances of natural language input in the message queue utilizing an NLP model to determine an intent classification for the instances of natural language input in the message queue, and clearing the message queue. For instance as shown in FIG. 8, the series of acts 800 includes acts 814 and 816 of processing the queue and clearing the queue, if the trigger is associated with a most recent instance of natural language input.

As further shown in FIG. 8, the series of acts 800 includes an act 818 of determining that the trigger is not associated with a most recent instance of natural language input. For example, the act 818 can involve, in response to the activated queue trigger not being associated with the most recently added instance of natural language input added to the message queue, deactivating the activated queue trigger. For instance as shown in FIG. 8, the series of acts 800 includes an act 820 of deactivating the trigger.

In one or more embodiments, the series of acts 800 includes acts of receiving, from the client device, an additional instance of natural language input with an associated chat state indicator. The acts 800 can then involve determining that the associated chat state indicates that the client device is receiving ongoing user input. The series of acts 800 can then involve, in response to determining that the associated chat state indicator indicates that the client device is receiving ongoing user input, adding the additional instance of natural language input to the message queue.

In one or more embodiments, the series of acts 800 includes acts of receiving an updated chat state indicator. In response to determining that the updated chat state indicator indicates that the client device is not receiving ongoing user input and determining that a number of instances of natural language input in the message queue is more than the predetermined threshold, the acts 800 can involve processing instances of natural language input in the message queue utilizing the NLP model to determine an additional intent classification.

In one or more embodiments, the series of acts 800 includes acts of detecting an additional activated queue trigger and determining that the additional activated queue trigger is associated with a current most recently added instance of natural language input in the message queue. The acts 800 can further involve receiving an updated chat state indicator. After detecting the additional activated queue trigger, the acts 800 can involve determining that the updated chat state indicator indicates that the client device is not receiving ongoing user input. In response to determining that the updated chat state indicator indicates that client device is receiving ongoing user input, the acts 800 can involve resetting the additional activated queue trigger.

In one or more embodiments, the series of acts 800 includes acts of analyzing the instances of natural language input in the message queue utilizing a parts of speech tagger to determine that the instances of natural language input in the message queue form a complete message. The act of processing the instances of natural language input in the message queue utilizing the NLP model to determine the intent classification can be in response to determining that the instances of natural language input in the message queue form a complete message.

FIG. 9 illustrates a flowchart of a series of acts 900 for generating one or more responses to instances of natural language input based on determined intent classifications in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown in FIG. 9, the series of acts 900 includes an act 902 of receiving an instance of natural language input. For example, the act 902 can involve receiving, from a client device, an instance natural language input. Act 902 can also involve determining a current state of user input. In other words, act 902 can involve receiving a chat state indictor. As shown in FIG. 9, the series of acts 900 includes an act 904 of adding the natural language input to a queue. For example, the act 904 can involve adding the natural language input to a message queue.

As shown in FIG. 9, the series of acts 900 includes an act 906 based on the chat state being set to active (e.g., having received a chat state indicator of active). In response to determining that the current state of user input is active, the series of acts 900 includes an act 908 of assigning a queue trigger, an act 910 of detecting activation of the queue trigger, an act 912 of processing the queue, and an act 914 of generating a response. For example, the act 908 can involve assigning a queue trigger to the. In one or more embodiments, the series of acts 900 includes acts of: determining a number of instances of natural language input in the message queue; and wherein assigning the queue trigger to the natural language input is in response to determining that the number of instances of natural language input in the message queue is not higher than a predetermined threshold.

The act 910 can involve detecting that the queue trigger assigned to the natural language input is activated. In one or more embodiments, the series of acts 900 includes an act of, in response to determining that the queue trigger assigned to the natural language input is activated and that the natural language input is not next in the message queue, deactivating the activated queue trigger assigned to the.

In one or more embodiments, the series of acts 900 includes acts of: in response to determining that the queue trigger assigned to the natural language input is activated, that the natural language input is next in the message queue, and that the current state associated with the client device has changed to composing: setting the current state indicator to active; and resetting the queue trigger assigned to the.

The act 912 can involve processing instances of natural language input in the message queue utilizing an NLP model to determine intent classifications of the instances of natural language input in the message queue. For example, processing instances of natural language input can include generating input vectors comprising the instances of natural language input; processing the generated input vectors utilizing an NLP model to generate intent classifications for the instances of natural language input. In one or more embodiments, the series of acts 900 includes acts of: determining whether the natural language input is next in the message queue; and wherein processing the instances of natural language input in the message queue is in response to determining that the queue trigger assigned to the natural language input is activated and that the natural language input is next in the message queue.

And the act 914 can involve generating one or more responses based on the determined intent classification of the instances of natural language input in the message queue. For example, generating one or more response can involve generating at least one selectable natural language message element based on the determined intent classifications.

In one or more embodiments, the series of acts 900 can include an act of, in response to processing instances of natural language input in the message queue, clearing the message queue. Furthermore, the series of acts 900 can include an acts of: determining that a current state associated with the client device has changed to composing; and in response to determining that the current state of the client device has changed to composing: determining a conversation identifier associated with the client device; and adding the natural language input and the current state indicator to the message queue in association with the conversation identifier.

In addition (or in the alternative) to the acts described above, in some embodiments, the acts 800 or 900 include an act for processing a message queue comprising the natural language input in response to a detected queue trigger activation and based on the current state indicator. In particular, the algorithm and acts described above in relation to FIGS. 2-4 can comprise the corresponding acts (or structure) for processing a message queue comprising the natural language input in response to a detected queue trigger activation and based on the current state indicator.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
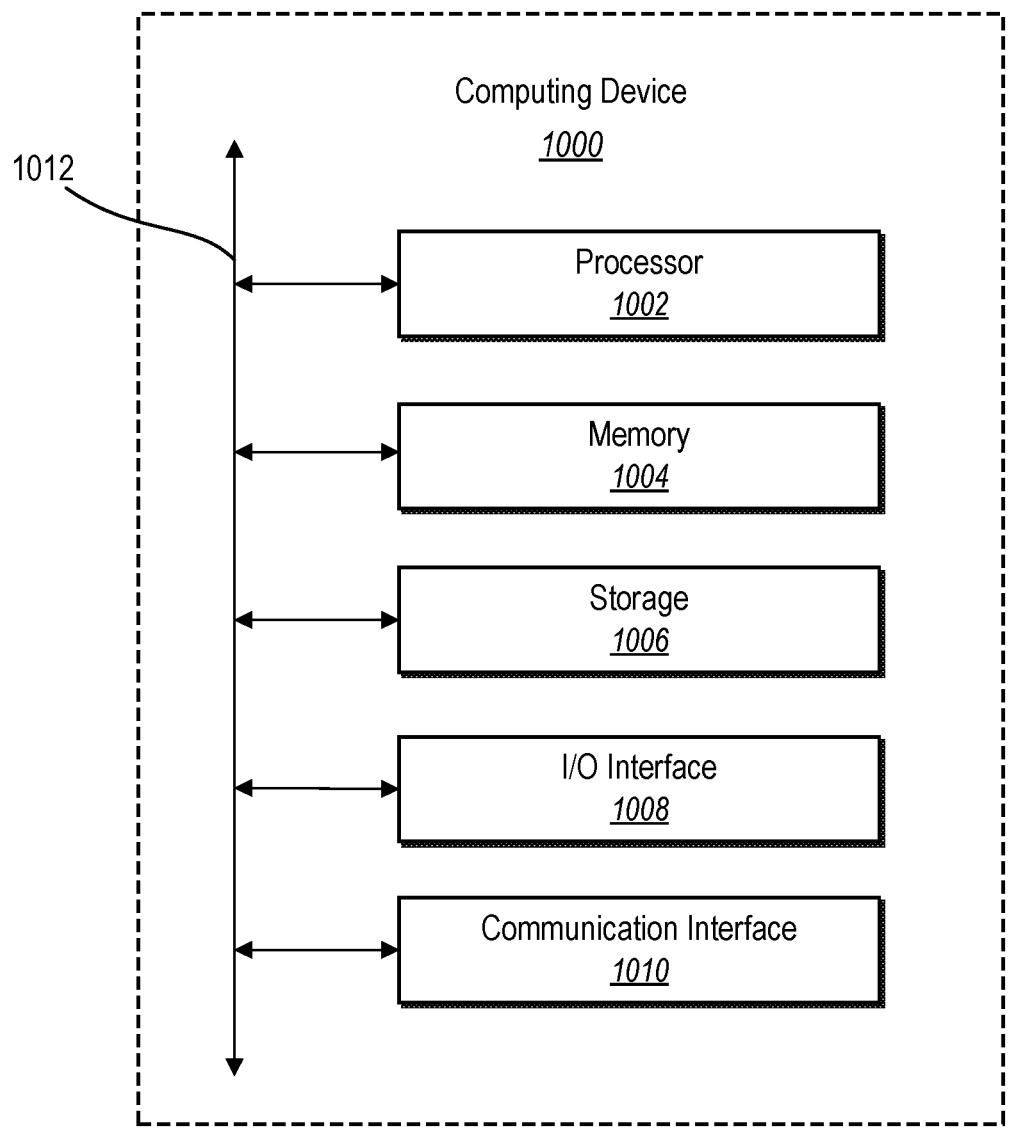
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 106, and the client device 112). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable storage medium storing instructions thereon that, when executed by at least one processor, cause a computer system to:

receive, from a client device, an instance of natural language input and a chat state indicator indicating whether the client device is receiving ongoing user input;

add the instance of natural language input to a message queue;

in response to determining that the chat state indicator indicates that the client device not receiving ongoing user input and that a number of instances of natural language input in the message queue is less than a predetermined threshold, assign a queue trigger to the instance of natural language input;
detect an activated queue trigger;
determine that the activated queue trigger is associated with a most recently added instance of natural language input in the message queue; and
in response to determining that the activated queue trigger is associated with the most recently added instance of natural language input in the message queue, process instances of natural language input in the message queue utilizing a natural language processing (NLP) model to determine an intent classification of the natural language input.

2. The non-transitory computer-readable storage medium as recited in claim 1, further storing instructions that, when executed by the at least one processor, cause the computer system to:
receive, from the client device, an additional instance of natural language input with an associated chat state indicator;
determine that the associated chat state indicator indicates that the client device is receiving ongoing user input; and
in response to determining that the associated chat state indicator indicates that the client device is receiving ongoing user input: add the additional instance of natural language input to the message queue.

3. The non-transitory computer-readable storage medium as recited in claim 2, further storing instructions that, when executed by the at least one processor, cause the computer system to:
receive an updated chat state indicator; and
in response to determining that the updated chat state indicator indicates that the client device is not receiving ongoing user input and determining that a number of instances of natural language input in the message queue is more than the predetermined threshold, process any instances of natural language input in the message queue utilizing the NLP model to determine an additional intent classification.

4. The non-transitory computer-readable storage medium as recited in claim 1, wherein:
assigning the queue trigger to the instance of natural language input comprises assigning a time elapse trigger to the instance of natural language input; and
detecting the activated queue trigger comprises detecting that a predetermined amount of time has elapsed since the time elapse trigger was assigned to the instance of natural language input.

5. The non-transitory computer-readable storage medium as recited in claim 1, further storing instructions that, when executed by the at least one processor, cause the computer system to:
detect an additional activated queue trigger;
determine that the additional activated queue trigger is associated with a current most recently added instance of natural language input in the message queue;
receive an updated chat state indicator;
after detecting the additional activated queue trigger, determine that the updated chat state indicator indicates that the client device is not receiving ongoing user input; and
in response to determining that the updated chat state indicator indicates that client device is receiving ongoing user input: reset the additional activated queue trigger.

6. The non-transitory computer-readable storage medium as recited in claim 1, further storing instructions that, when executed by the at least one processor, cause the computer system to:
generate a response based on the intent classification; and
provide the response to the client device.

7. The non-transitory computer-readable storage medium as recited in claim 1, further storing instructions that, when executed by the at least one processor, cause the computer system to:
analyze the instances of natural language input in the message queue utilizing a parts of speech tagger to determine that the instances of natural language input in the message queue form a complete message; and
wherein processing the instances of natural language input in the message queue utilizing the NLP model to determine the intent classification is in response to determining that the instances of natural language input in the message queue form a complete message.

8. A system comprising:
one or more memory devices comprising a message queue; and
one or more computing devices configured to cause the system to:
receive an instance of natural language input;
determine a current state of user input;
add the instance of natural language input to the message queue; and
in response to determining that the current state of user input is active:
assign a queue trigger to the instance of natural language input;
detect that the queue trigger assigned to the instance of natural language input is activated;
determine that the instance of natural language input is a most recent instance of natural language input in the message queue;
determine that the current state of user input has changed to composing; and
in response to determining that the current state of user input has changed to composing, deactivate the queue trigger and revise a trigger setting associated with the queue trigger.

9. The system as recited in claim 8, wherein the one or more computing devices are configured to cause the system to determine that the current state of the user input by:
determining whether the user input is ongoing;
if the user input is ongoing:
determine whether an ongoing user input trigger is activated;
if the ongoing user input trigger is activated, set the current state of user input to active; or
if the ongoing user input trigger is not activated, set the current state of user input to composing; and
if the user input is not ongoing:
determine whether an input trigger is activated;
if the input trigger is activated, set the current state of user input to active; or
if the input trigger is not activated, set the current state of user input to composing.

10. The system as recited in claim 9, wherein the one or more computing devices are configured to cause the system to determine whether an ongoing user input trigger is activated by determining one or more of an input rate change association user input, a specific character identified within the user input, a keyword identified within the user input, or grammatic or syntactic characteristics of the user input.

11. The system as recited in claim 9, wherein the one or more computing devices are configured to cause the system to determine whether an input trigger is activated by determining one or more a pause of a predetermined length of time, an input rate change, a specific character identified within the user input, a keyword identified within the user input, or grammatic or syntactic characteristics of the user input.

12. The system as recited in claim 8, wherein the one or more computing devices are further configured to cause the system to
detect that an additional queue trigger is activated;
determine that an additional instance of natural language associated with the queue trigger is the most recent instance of natural language added to the message queue;
determine that the current state of user input has changed from composing to active;
in response to determining that the current state of user input has changed to active, process instances of natural language input in the message queue utilizing a natural language processing (NLP) model to determine an intent classification; and
generate one or more responses based on the determined intent classification of the instances of natural language input in the message queue.

13. The system as recited in claim 8, wherein the one or more computing devices are further configured to cause the system to:
determine a number of instances of natural language input in the message queue; and
wherein assigning the queue trigger to the instance of natural language input is in response to determining that the number of instances of natural language input in the message queue is not higher than a predetermined threshold.

14. The system as recited in claim 8, wherein the one or more computing devices are further configured to cause the system to:
determine that the current state of user input has changed from composing to active;
in response to determining that the current state of user input has changed to active, process instances of natural language input in the message queue utilizing a natural language processing (NLP) model to determine an intent classification; and
generate one or more responses based on the determined intent classification of the instances of natural language input in the message queue.

15. The system as recited in claim 8, wherein the one or more computing devices are further configured to cause the system to:
detect that an additional queue trigger is activated;
determine that an additional instance of natural language input associated with the additional queue trigger is not a most recent instance of natural language input added to the message queue; and
in response to determining that the additional queue trigger is not associated with the most recent instance of natural language input added to the message queue, deactivate the activated additional queue trigger.

16. The system as recited in claim 12, wherein the one or more computing devices are further configured to cause the system to:
analyze the instances of natural language input in the message queue utilizing a parts of speech tagger to determine that the instances of natural language input in the message queue form a complete message; and
wherein processing the instances of natural language input in the message queue utilizing the NLP model to determine the intent classification is in response to determining that the instances of natural language input in the message queue form a complete message.

17. The system as recited in claim 12, wherein the one or more computing devices are further configured to cause the system to process the instances of natural language input utilizing one or more of a deep-learning based NLP model or a non-deep-learning NLP model to generate the intent classification.

18. A computer-implemented method for improving accuracy of natural language input classification comprising:
receiving, from a client device, an instance of natural language input;
adding the instance of natural language input to a message queue;
determining a current state of user input;
assigning a queue trigger to the instance of natural language input;
detecting that the queue trigger assigned to the instance of natural language input is activated;
determining that the instance of natural language input is not a most recent instance of natural language input added to the message queue; and
in response to determining that the queue trigger is not associated with the most recent instance of natural language input added to the message queue, deactivating the queue trigger.

19. The computer-implemented method as recited in claim 18, further comprising:
detecting that an additional queue trigger is activated;
determining that an additional instance of natural language input associated with the additional queue trigger is the most recent instance of natural language input added to the message queue;
in response to determining that the additional queue trigger is associated with the most recent instance of natural language added to the message queue, determining an intent classification for instances of natural language input in the message queue; and
in res response to determining an intent classification, generating a response message based on the intent classification.

20. The computer-implemented method as recited in claim 18, further comprising determining the current state of user input at the client device is active by:
determining whether the user input is ongoing;
if the user input is ongoing, determining that an ongoing user input trigger is activated; or
if the user input is not ongoing, determining that an input trigger is activated.

* * * * *